United States Patent
Paulmann

(10) Patent No.: US 8,768,749 B2
(45) Date of Patent: *Jul. 1, 2014

(54) SYSTEMS AND METHODS FOR ANALYSIS OF LEGAL SERVICE PROVIDERS AND COMPARATIVE UNIT COSTS OR RATIO COSTS

(71) Applicant: The Counsel Management Group, LLC, New York, NY (US)

(72) Inventor: Frederick Henry Paulmann, Fairfield, CT (US)

(73) Assignee: The Counsel Management Group, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/021,174

(22) Filed: Sep. 9, 2013

(65) Prior Publication Data

US 2014/0012623 A1 Jan. 9, 2014

Related U.S. Application Data

(63) Continuation-in-part of application No. 13/046,213, filed on Mar. 11, 2011, now Pat. No. 8,554,603.

(60) Provisional application No. 61/313,648, filed on Mar. 12, 2010.

(51) Int. Cl.
*G06Q 30/02* (2012.01)
*G06Q 10/06* (2012.01)
*G06Q 10/10* (2012.01)
*G06Q 40/02* (2012.01)
*G06Q 40/00* (2012.01)

(52) U.S. Cl.
USPC ............... 705/7.35; 75/7.13; 75/30; 75/37; 717/104; 235/379; 235/380

(58) Field of Classification Search
CPC ....... G06Q 40/10; G06Q 40/02; G06Q 40/00; G06Q 40/04; G06Q 40/06; G06Q 30/04; G06Q 20/102; G06Q 10/06311; G06Q 10/06; G06Q 10/10; G06Q 20/1085; G06Q 20/341; G06F 8/10; G06F 8/20; G06F 8/24; G07F 19/20; G07F 19/201; G07F 7/1008; G07F 7/08

USPC ................... 705/7.35, 7.13, 30, 37; 717/104; 235/379, 380

See application file for complete search history.

(56) References Cited

U.S. PATENT DOCUMENTS 6,289,317 B1 * 9/2001 Peterson ...................... 705/7.37
6,622,128 B1 * 9/2003 Bedell et al. .................. 705/30

(Continued)

OTHER PUBLICATIONS

Whittington, George. "Some Basic Properties of Accounting Ratios." Journal of Business Finance and Accounting. Summer 1980. Profitability, Accounting Theory and Methodology: The selected essays of Geoffrey Whittington. New York, NY: Rutledge, 2007. pp. 219-232.*

(Continued)

*Primary Examiner* — Matthew Gart
*Assistant Examiner* — Reva R Danzig
(74) *Attorney, Agent, or Firm* — Crowell & Moring LLP

(57) ABSTRACT

Systems and methods for analyzing legal service providers and unit or ratio costs are provided. Billing data from legal services providers is analyzed to identify common tasks based on task codes. The common tasks are then analyzed to determine a unit cost or ratio cost for the tasks or a ratio cost for the tasks compared to the total costs for a matter. Analysis constraints are applied to the billing data to generate a cost model, which can be output in a variety of different graphical formats. This output, which identifying at least some of the total matter costs on a unit cost or ratio cost basis, allows for comparison of legal services provided by a number of different legal services providers. It also allows for comparing price quotes from a number of legal services providers against each other and against historical cost information.

22 Claims, 33 Drawing Sheets

(56) References Cited

U.S. PATENT DOCUMENTS

| | | | |
|---|---|---|---|
| 6,882,986 B1 | | 4/2005 | Heinemann et al. |
| 7,813,978 B2* | | 10/2010 | Abbott et al. ................ 705/35 |
| 7,958,023 B1 | | 6/2011 | Shibayama |
| 2001/0034675 A1 | | 10/2001 | Belford et al. |
| 2004/0093583 A1* | | 5/2004 | McAnaney et al. ........... 717/103 |
| 2005/0203814 A1 | | 9/2005 | Derry et al. |
| 2006/0173775 A1* | | 8/2006 | Cullen et al. ................ 705/37 |
| 2009/0037247 A1* | | 2/2009 | Quinn ................ 705/8 |

OTHER PUBLICATIONS

Difinition of Unit Cost, http://ww.businessdictionary.com/defintion/unit-cost.html.*

Frederick Paulmann and Susan Hackett, "What do Hours Have to do with Value?", ACC Docket Oct. 2009, pp. 1-8.

ACC, Association of Corporate Counsel, ACC Value-Based Fee Primer, Jul. 2010.

Frederick H. Paulmann, "Effective Partnering {between} Inside and Outside Counsel: Two-Year Performance Highlights and Data from Pfizer", ACC Docket, Nov. 2008, pp. 90-104.

ACC, Association of Corporate Counsel, "How to Migrate from Traditional Billing to Alternative Fees," ACC Value Challenge Tool Kit Resource, Sep. 2009.

ACC, Association of Corporate Counsel, "How to Manage Billing Data to Improve Value and Enable Alternative Fees . . . Even if You Don't Have an E-billing System," ACC Value Challenge Took Kit Resource, Sep. 2009.

ACC, Association of Corporate Counsel, "How to Train Staff to Properly Manage Budgets," ACC Value Challenge Took Kit Resource, Sep. 2009.

ACC, Association of Corporate Counsel, Value Practice: De-constructing Legal Services—Calculating Unit Costs & Component-Based Pricing Structures Johnson & Johnson's Approach to Alternative Fees.

Van Itallie et al., "Instead of the Billable Hour, What? A Proposal for Litigators," Association of Corporate Counsel (ACC) Docket, pp. 22-24, 26, 28, 30-32, 34, Oct. 2009.

Definition of Unit Cost, http://www.businessdictionary.com/definition/unit-cost.html.

* cited by examiner

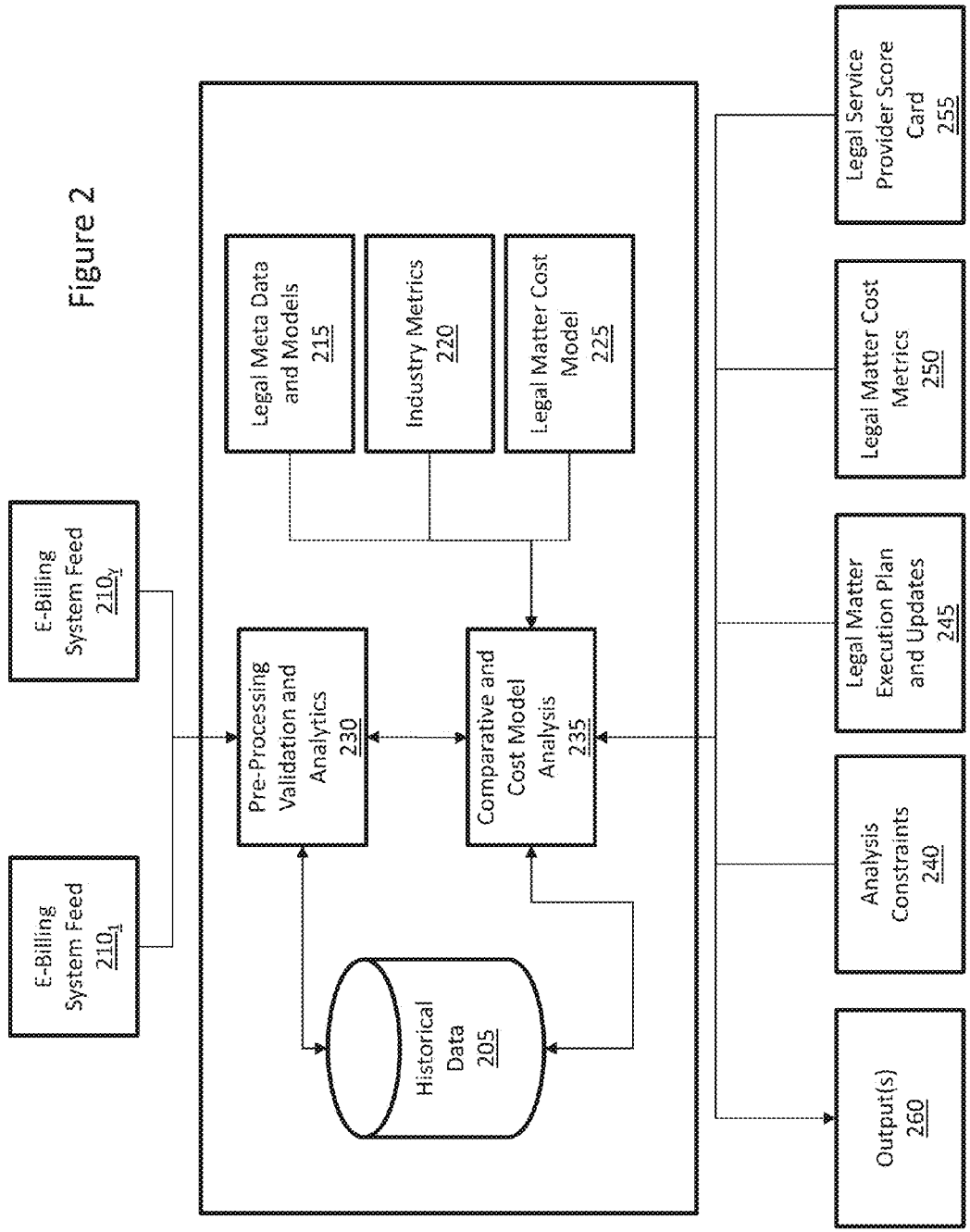

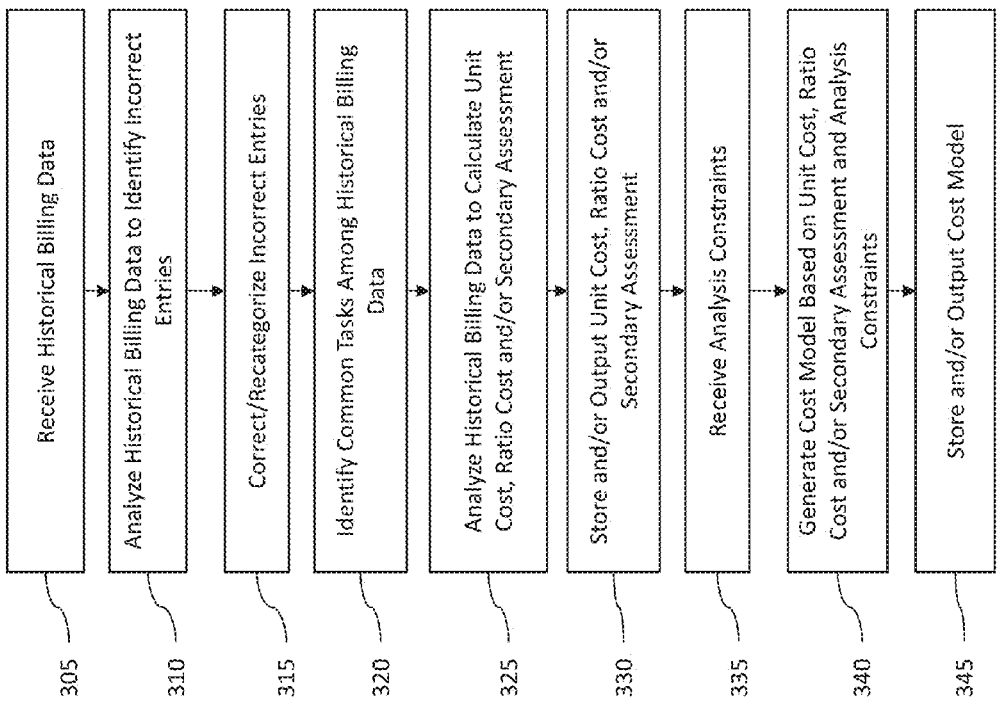

| UTBMS Litigation Codes | CMG Report / Analysis |
| --- | --- |
| L100 Case Assessment, Development and Administration | |
| L110 Fact Investigation/Development | RATIO ANALYSIS: track and assess this code as a percentage of overall spend and combined with other analytics. Where clients opt for more granularity, track unit cost on a "per fact witness interview" basis. |
| L120 Analysis/Strategy | RATIO ANALYSIS: track and assess this code as a percentage of overall spend and combined with other analytics. |
| L130 Experts/Consultants | Per unit price for expert assessment/development; also calculate a combined "omnibus expert cost" metric by analyzing L130 plus L340, divided by number of experts. |
| L140 Document/File Management | Track this code as a percentage of overall spend and combine with other analytics. Combine L140, 150 and 190 for an "Administrative Omnibus" category to see what aggregate percentage of overall spend they make up. Then compare this across matters. |
| L150 Budgeting | RATIO ANALYSIS: track and assess this code as a percentage of overall spend and combined with other analytics. |
| L160 Settlement/Non-Binding ADR | RATIO ANALYSIS: track and assess this code as a percentage of overall spend and combined with other analytics. |
| L190 Other Case Assessment, Development and Administration | RATIO ANALYSIS: track and assess this code as a percentage of overall spend and combined with other analytics. |

Figure 5A

| UTBMS Litigation Codes | CMG Report / Analysis |
|---|---|
| L200 Pre-Trial Pleadings and Motions | |
| L210 Pleadings | RATIO ANALYSIS: track and assess this code as a percentage of overall spend and combined with other analytics. |
| L220 Preliminary Injunctions/Provisional Remedies | RATIO ANALYSIS: track and assess this code as a percentage of overall spend and combined with other analytics. |
| L230 Court Mandated Conferences | RATIO ANALYSIS: track and assess this code as a percentage of overall spend and combined with other analytics. |
| L240 Dispositive Motions | Per unit cost for each type of motion; also a broader combined metric called "Motions, Briefings, Argument" ("MBA"). This would be an aggregation combining L240, L520 and L530. |
| L250 Other Written Motions and Submissions | RATIO ANALYSIS: track and assess this code as a percentage of overall spend and combined with other analytics. Where clients opt for more granularity, track unit cost on a per motion basis for items like Daubert / Frye motions. |
| L260 Class Action Certification and Notice | RATIO ANALYSIS: track and assess this code as a percentage of overall spend and combined with other analytics. |

Figure 5B

| UTBMS Litigation Codes | CMG Report / Analysis |
|---|---|
| L300 Discovery | |
| L310 Written Discovery | RATIO ANALYSIS: track and assess this code as a percentage of overall spend and combined with other analytics. |
| L320 Document Production | L320 line item measures are: $ per GB/page and $ per custodian. There is a separate aggregate metric called "omnibus discovery," which combines assessments on L320, L330, L340 and L350). |
| L330 Depositions | L330 line item measure is $ per deposition of each type. Also this is part of the aggregate metric called "omnibus discovery". |
| L340 Expert Discovery | L340 line item measure is $ per expert. Also this is part of the aggregate metric called "omnibus discovery," and the "omnibus expert cost" metric (combined with L130"). |
| L350 Discovery Motions | RATIO ANALYSIS: track and assess this code as a percentage of overall spend and combined with other analytics. Where clients opt for more granularity, track unit cost on a per discovery motion basis. |
| L390 Other Discovery | RATIO ANALYSIS: track and assess this code as a percentage of overall spend and combined with other analytics. |

Figure 5C

| UTBMS Litigation Codes | CMG Report / Analysis |
|---|---|
| L400 Trial Preparation and Trial | |
| L410 Fact Witnesses | Per unit cost for trial related fees (including preparation) per fact witness. |
| L420 Expert Witnesses | Per unit cost for trial related fees (including preparation) per expert witness. |
| L430 Written Motions and Submissions | RATIO ANALYSIS: track and assess this code as a percentage of overall spend and combined with other analytics. Where clients opt for more granularity, track unit cost on a per motion basis for items like in limine motion. |
| L440 Other Trial Preparation and Support | "Trial prep" measures are: trial prep $ per week of trial prep, trial prep fees as a function of trial fees, and trial prep fees as a function of the number of witnesses. |
| L450 Trial and Hearing Attendance | Trial measures are fees per trial day, fees per weekend / holiday days throughout the course of trial, trial fees as a function of trial prep fees, trial fees as a function of the number of witnesses, and trial expenses as a function of trial fees. |
| L460 Post-Trial Motions and Submissions | RATIO ANALYSIS: track and assess this code as a percentage of overall spend and combined with other analytics. |
| L470 Enforcement | RATIO ANALYSIS: track and assess this code as a percentage of overall spend and combined with other analytics. |
| L500 Appeal | |
| L510 Appellate Motions and Submissions | RATIO ANALYSIS: track and assess this code as a percentage of overall spend and combined with other analytics. |
| L520 Appellate Briefs | L520 line item measure is $ per brief; also part of aggregate measure called "Omnibus appeal" which combines L520 and L530. Also part of MBA (with L240, above). |
| L530 Oral Argument | L530 line item measure is $ per brief; also part of aggregate measure called "Omnibus appeal" which combines L520 and L530. Also part of MBA (with L240, above). |

Figure 5D

|  | Hours | Blended Rate | Unit Quantity | Unit Cost |
|---|---|---|---|---|
| L100 Case Assessment, Development & Administration | | | | |
| L110 Fact Investigation / Development | | | | |
| L120 Analysis / Strategy | | | | |
| L130 Experts / Consultants (including reports) | | | | |
|    *Plaintiff Experts* | | | | |
|    *Defense Experts* | | | | |
|    *Other L130* | | | | |
| L140 Document / File Management | | | | |
| L150 Budgeting | | | | |
| L160 Settlement / Non-Binding ADR | | | | |
| L190 Other Case Assessment, Development & Admin | | | | |
| L200 Pre-Trial Pleadings & Motions | | | | |
| L210 Pleadings | | | | |
| L220 Preliminary Injunctions/Provisional Remedies | | | | |
| L230 Court Mandated Conferences | | | | |
| L240 Dispositive Motions | | | | |
|    *Motions to Dismiss* | | | | |
|    *Summary Judgment Motions* | | | | |
|    *Other L240* | | | | |
| L250 Other Written Motions & Submissions | | | | |
|    *Daubert/Frye Motions* | | | | |
|    *Other L250* | | | | |
| L260 Class Action Cert & Notice | | | | |
| L300 Discovery | | | | |
| L310 Written Discovery | | | | |
| L320 Document Production | | | | |
|    *Number of Custodians* | | | | |
|    *Number of Pages* | | | | |
| L330 Depositions | | | | |
|    *Taking Depositions* | | | | |
|    *Defending Depositions* | | | | |
|    *Other L330* | | | | |
| L340 Expert Discovery | | | | |
|    *Plaintiff Expert Depositions* | | | | |
|    *Defense Expert Depositions* | | | | |
|    *Other L340* | | | | |
| L350 Discovery Motions | | | | |
|    *Offensive* | | | | |
|    *Defensive* | | | | |
|    *Other L350* | | | | |
| L390 Other Discovery | | | | |

FIG. 10B-1

| Total Amount | Start Date | End Date | Assumptions & Notes |
|---|---|---|---|
| 0 | | | |
| 0 | | | |
| 0 | | | |
| 0 | | | |
| 0 | | | |
| 0 | | | |
| 0 | | | |
| 0 | | | |
| 0 | | | |
| 0 | | | |
| 0 | | | |
| 0 | | | |
| 0 | | | |
| 0 | | | |
| 0 | | | |
| 0 | | | |
| 0 | | | |
| 0 | | | |
| 0 | | | |
| 0 | | | |
| 0 | | | |
| 0 | | | |
| 0 | | | |
| 0 | | | |
| 0 | | | |
| 0 | | | |
| 0 | | | |
| 0 | | | |
| 0 | | | |
| 0 | | | |
| 0 | | | |
| 0 | | | |
| 0 | | | |
| 0 | | | |
| 0 | | | |
| 0 | | | |
| 0 | | | |
| 0 | | | |
| 0 | | | |

FIG. 10B-2

| L400 Trial Preparation and Trial | | |
|---|---|---|
| L410 Fact Witnesses | | |
| *Plaintiff Fact Witnesses* | | |
| *Defense Fact Witnesses* | | |
| *Other L410* | | |
| L420 Expert Witnesses | | |
| *Plaintiff Experts* | | |
| *Defense Experts* | | |
| *Other L420* | | |
| L430 Written Motions & Submissions | | |
| L440 Other Trial Preparation & Support | | |
| L450 Trial Hearing & Attendance | | |
| *Trial Days (projected)* | | |
| *Weekend Days or Holidays Throughout Trial* | | |
| *Other L450* | | |
| L460 Post Trial Motions & Submissions | | |
| L470 Enforcement | | |
| L500 Appeal | | |
| L510 Appellate Motions & Submissions | | |
| L520 Appellate Briefs | | |
| L530 Oral Argument | | |

FIG. 10C-1

THE COUNSEL MANAGEMENT GROUP

Welcome [cmgdemo]/Logout/Preferences/Help

Dashboard  Legal Matters  Reports  Tools  Help        Home Page

Summary  Litigation Cost Model  Staffing Plan  Project Plan        [search]  GO

▶ Home  ▶ Legal Matters  ▶ Matter Five  ▶ Staffing Plan        REPORT  RSS

STAFFING PLAN

| SELECT | NAME | TITLE | GRADUATION | RATE | HOURS | CHARGE | ACTION |
|--------|------|-------|------------|------|-------|--------|--------|
| ☐ | Bill Lumbergh | Paralegal | 2004 | $100 | 0 | $0 | VIEW DELETE |
| ☐ | Ginger Grant | Associate 5th | 2004 | $475 | 0 | $0 | VIEW DELETE |
| ☐ | John Gill | Associate 4th | 2004 | $425 | 0 | $0 | VIEW DELETE |
| ☐ | Herb Tarlek | Partner | 2004 | $700 | 0 | $0 | VIEW DELETE |
| ☐ | Ralph Ferlie | Counsel | 2004 | $650 | 0 | $0 | VIEW DELETE |
| ☐ | Jim Hart | Associate 1st | 2004 | $275 | 0 | $0 | VIEW DELETE |
| ☐ | Angus Young | Partner | 1998 | $700 | 0 | $0 | VIEW DELETE |
| ☐ | SD Jones | Paralegal | 2004 | $150 | 0 | $0 | VIEW DELETE |
| ☐ | Jerome Carney | Associate 2nd | 2004 | $350 | 0 | $0 | VIEW DELETE |
| ☐ | Peter Mitchell | Sr. Paralegal | 2004 | $175 | 0 | $0 | VIEW DELETE |

Sidebar Menu
- Add Timesheet
- Deleted Selected

Legal News
- Miranda Dealt One-Two Punch by High Court
- 3rd Circuit Upholds Conviction of Former RiteAid General Counsel
- Google Rallies Defenses After Italian Court Convicts Company Exec Over Online Video
- Step 2 for Legal Holds: Analyze the Trigger Event
- Civic Hybrid Class Settlement Doesn't Pass Muster
- The Defections From White & Case Continue
- Circuit Court Sides With Crocs in Patent Fight

FIG. 11B

THE COUNSEL MANAGEMENT GROUP

Welcome [cmgdemo]/Logout/Preferences/Help   Home Page

Dashboard | Legal Matters | Reports | Tools | Help

Summary | Litigation Cost Model | Staffing Plan | Project Plan

▶ Home  ▶ Legal Matters  ▶ Matter Five  ▶ Staffing Plan  ▶ Timesheet - Thomas Lee Search [____] GO

SAVE   REPORT   RSS

Sidebar Menu
- Add Timesheet
- Deleted Selected

Legal News
- Miranda Dealt One-Two Punch by High Court
- 3rd Circuit Upholds Conviction of Former RiteAid General Counsel
- Google Rallies Defenses After Italian Court Convicts Company Exec Over Online Video
- Step 2 for Legal Holds: Analyze the Trigger Event
- Civic Hybrid Class Settlement Doesn't Pass Muster
- The Defections From White & Case Continue
- Circuit Court Sides With Crocs in Patent Fight

TIMESHEET - THOMAS LEE (TOTAL: $163500)

| Case Assessment & Admin | Pre-Trial Pleadings & Motions | Discovery | Document Production & Review | Trial Preparation & Trial | | |
|---|---|---|---|---|---|---|
| Initial Disclosures | Written Discovery | Depositions | Expert Discovery | Discovery Motions | E-Discovery Services | Appeal |

| DESCRIPTION | HOURS | RATE | CHARGE |
|---|---|---|---|
| Fact Witness Deposition Offensive (Taking): | 80 | 750 | 60000 |
| Fact Witness Deposition Defensive (Defending): | 0 | 750 | 0 |
| Fact Witness Deposition Third Party (Monitoring): | 0 | 750 | 0 |
| Total: | | | 60000 |

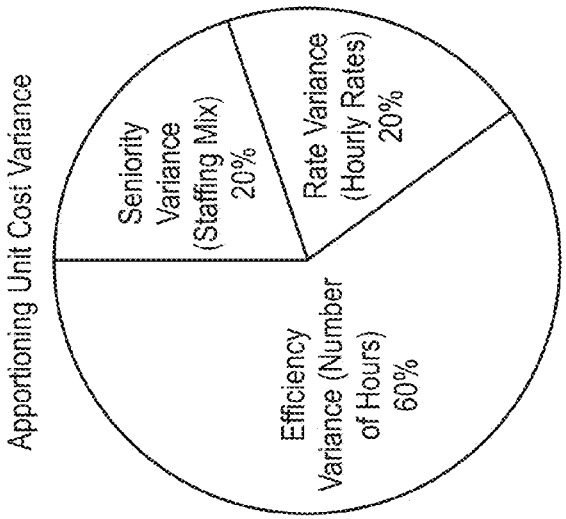
FIG. 13B
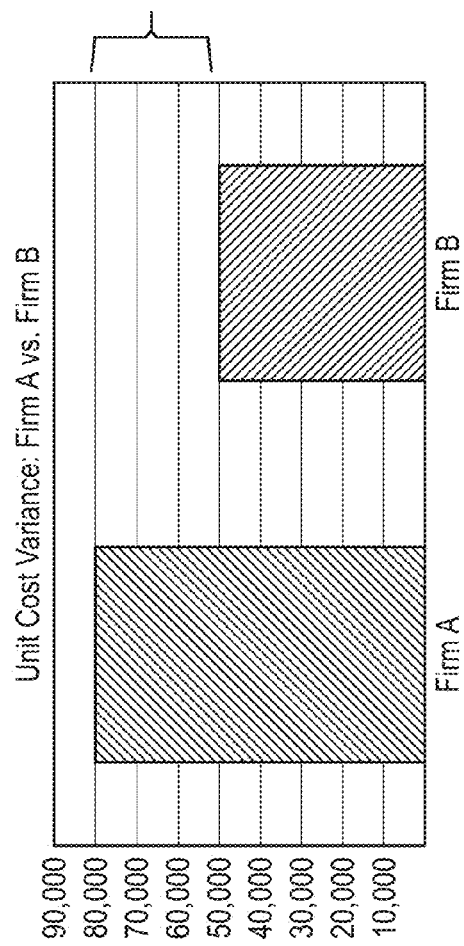
FIG. 13A
FIG. 13C

SYSTEMS AND METHODS FOR ANALYSIS OF LEGAL SERVICE PROVIDERS AND COMPARATIVE UNIT COSTS OR RATIO COSTS

CROSS-REFERENCE TO RELATED APPLICATIONS

This application claims the benefit of U.S. Provisional Application No. 61/313,648, filed Mar. 12, 2010, the entire disclosure of which is herein expressly incorporated by reference. This application is also a continuation-in-part of U.S. patent application Ser. No. 13/046,213, filed Mar. 11, 2011, the entire disclosure of which is herein expressly incorporated by reference.

BACKGROUND OF THE INVENTION

Many industries have recently adapted their business models to adopt a number of technological efficiencies. For example, pricing of retail products has become quite competitive due to comparative pricing engines available through the internet. Accordingly, it is no longer necessary to visit a number of stores to find a best price for a particular product, but instead a consumer can obtain this information from a single webpage. Similarly, many manufacturers operate on a just-in-time production process in which a minimum number of components are maintained on site, just enough to meet the short term expected demand for the components and the associated product. This is achieved due to improved modeling of the production process to account for demand for the product and when particular components will be needed during the production process.

SUMMARY OF THE INVENTION

Compared to product manufacturing and sales, many professional service providers, such as legal services providers, have made very few changes to adapt their business models to incorporate technological efficiencies. Unlike manufactured products, which are in essence interchangeable, the value and quality of services depends highly upon the people providing the services. Additionally, certain services are so complex and dependent upon the quality of the service provider that simple hourly rate quote comparisons may not be sufficient. Thus, for example, while it may be sufficient to receive a number of competing bids for painting a house or building a deck, it is much more difficult to compare competing bids for handling a litigation, licensing or transactional matter. This difficulty is due, at least in part, to many variables in how these matters are staffed and organized. Complex litigation, such as class action or patent infringement litigation, may be staffed by more senior level attorneys than junior level attorneys at one legal service provider and by many junior level attorneys than senior level attorneys at another legal service provider. Similarly, different attorneys have different litigation strategies, some employ a lot of resources for motions practice, while others do so for discovery. Relative efficiency of the various service providers is another factor complicating this analysis. Some attorneys take more time to complete the work, others less. Hourly rates simply do not measure what the ultimate fee will be.

Although there are some tools for companies to manage outside counsel, these tools typically provide a limited ability to understand whether companies are receiving value for their money. Thus, for example, while many companies have adopted electronic billing systems, these systems do little more than track legal spend and compliance with billing guidelines. Similarly, although matter management systems may be able to track the status of particular matters, including due dates and associated documents, these often are not integrated with billing information. Even if they are, existing systems provide little useful guidance on what various pieces of work cost on an "all in," unit or ratio cost basis, and how these costs compare in context with similar projects within the company, across the industry, and compared to other industries.

Exemplary embodiments of the present invention overcome the above-identified and other deficiencies of conventional systems and methods. In particular, exemplary embodiments of the present invention provide systems and methods for analysis of professional service providers, such as legal services providers, with the capability to: (1) budget legal matters on a unit or ratio cost basis, based on past spending and comparative price quotes or bids for legal services, (2) better assess the financial performance of legal service providers and (3) more reliably track the spending on matters against a budget geared to unit costs or ratio costs.

Other objects, advantages and novel features of the present invention will become apparent from the following detailed description of the invention when considered in conjunction with the accompanying drawings.

BRIEF DESCRIPTION OF THE DRAWING FIGURES

FIG. 2 is a schematic diagram of an exemplary system providing the back-end processing of the present invention;

FIG. 3 is a flow diagram of an exemplary method of pre-processing and validating billing data in accordance with the present invention;

FIGS. 5A-5D are charts describing different types of analysis performed for different tasks in accordance with exemplary embodiments of the present invention;

FIGS. 10A-10E illustrate an exemplary mechanisms for receiving the price quotes for the services in accordance with the present invention;

FIGS. 11A-11D illustrate exemplary mechanisms for inputting project and staffing plan data in accordance with the present invention;

Figure 14:
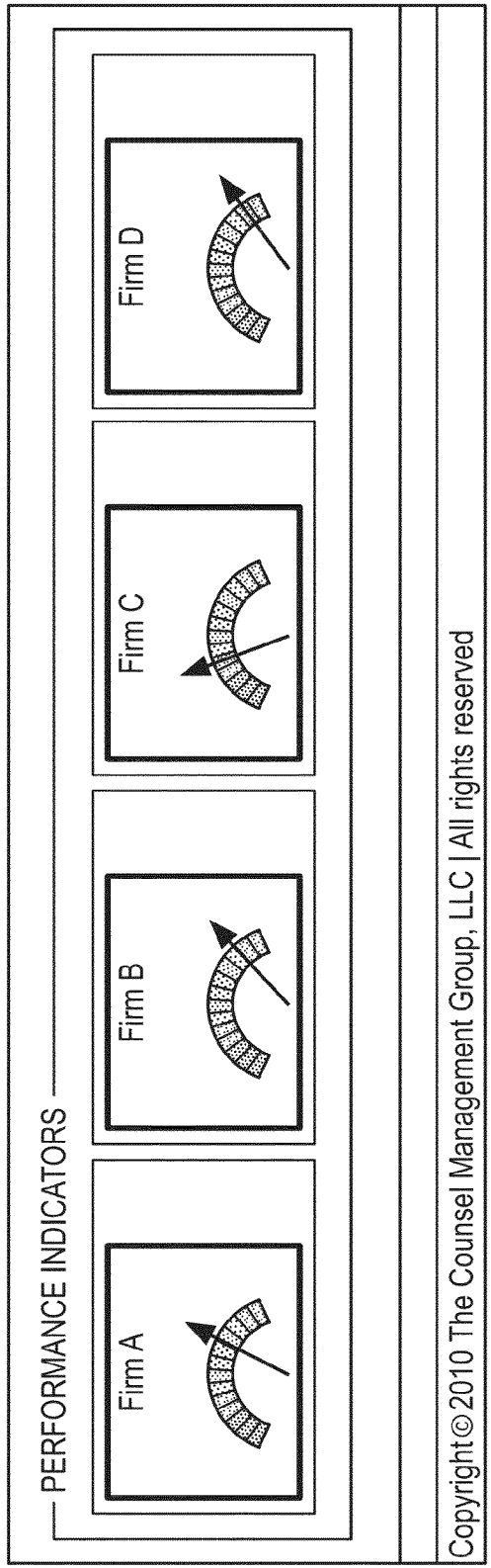

FIGS. 13A and 13B respectively illustrate resulting graphs for unit cost variance in bar and pie graph form in accordance with exemplary embodiments of the present invention;

FIG. 13C illustrates an exemplary formula for determining the unit cost variance in accordance with the present invention; and FIG. 14 illustrates exemplary legal service provider performance indicators in accordance with the present invention.

DETAILED DESCRIPTION OF THE PREFERRED EMBODIMENTS

Figure 1A:
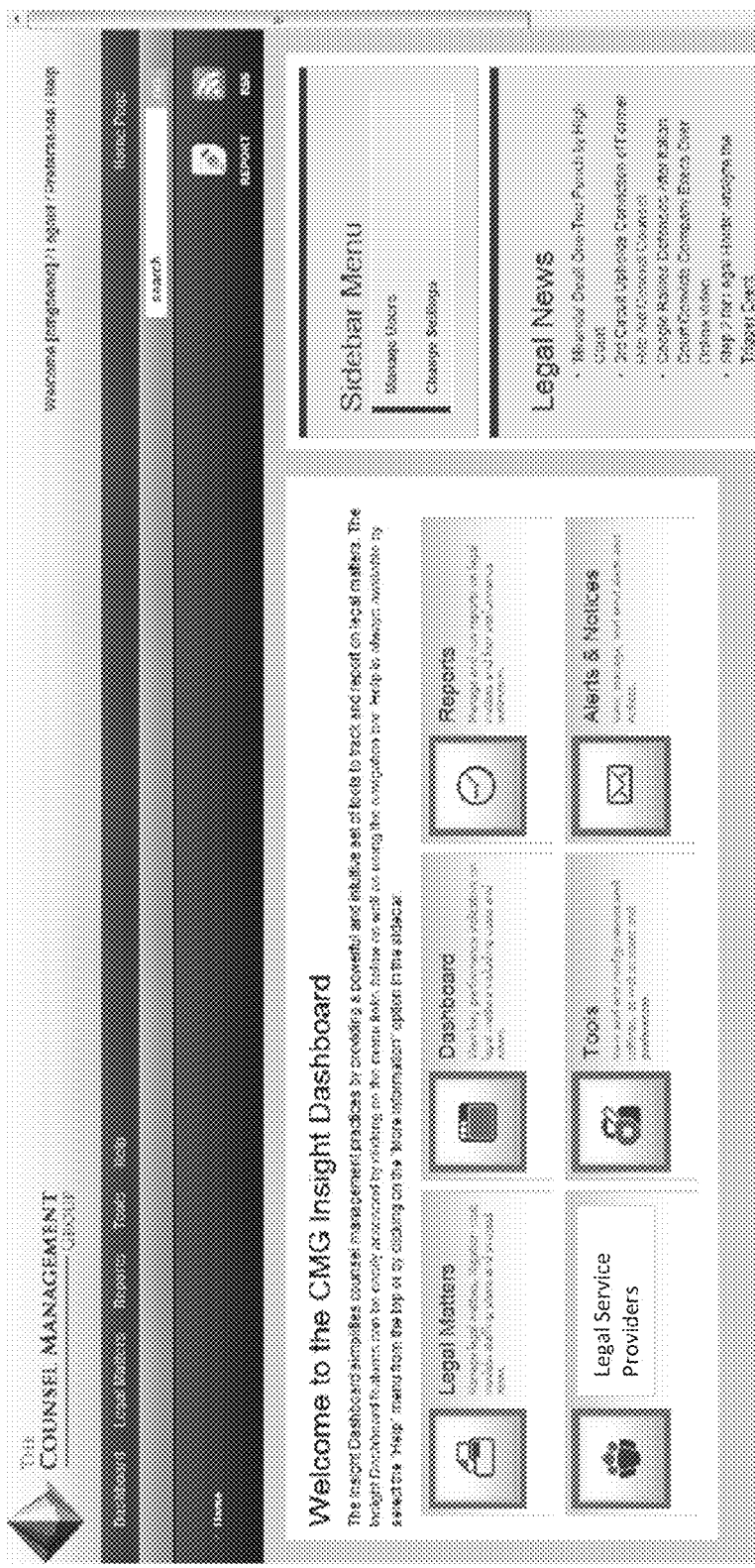
FIG. 1A illustrates an exemplary screen shot of a homepage of an application in accordance with the present invention.
Figure 1B:
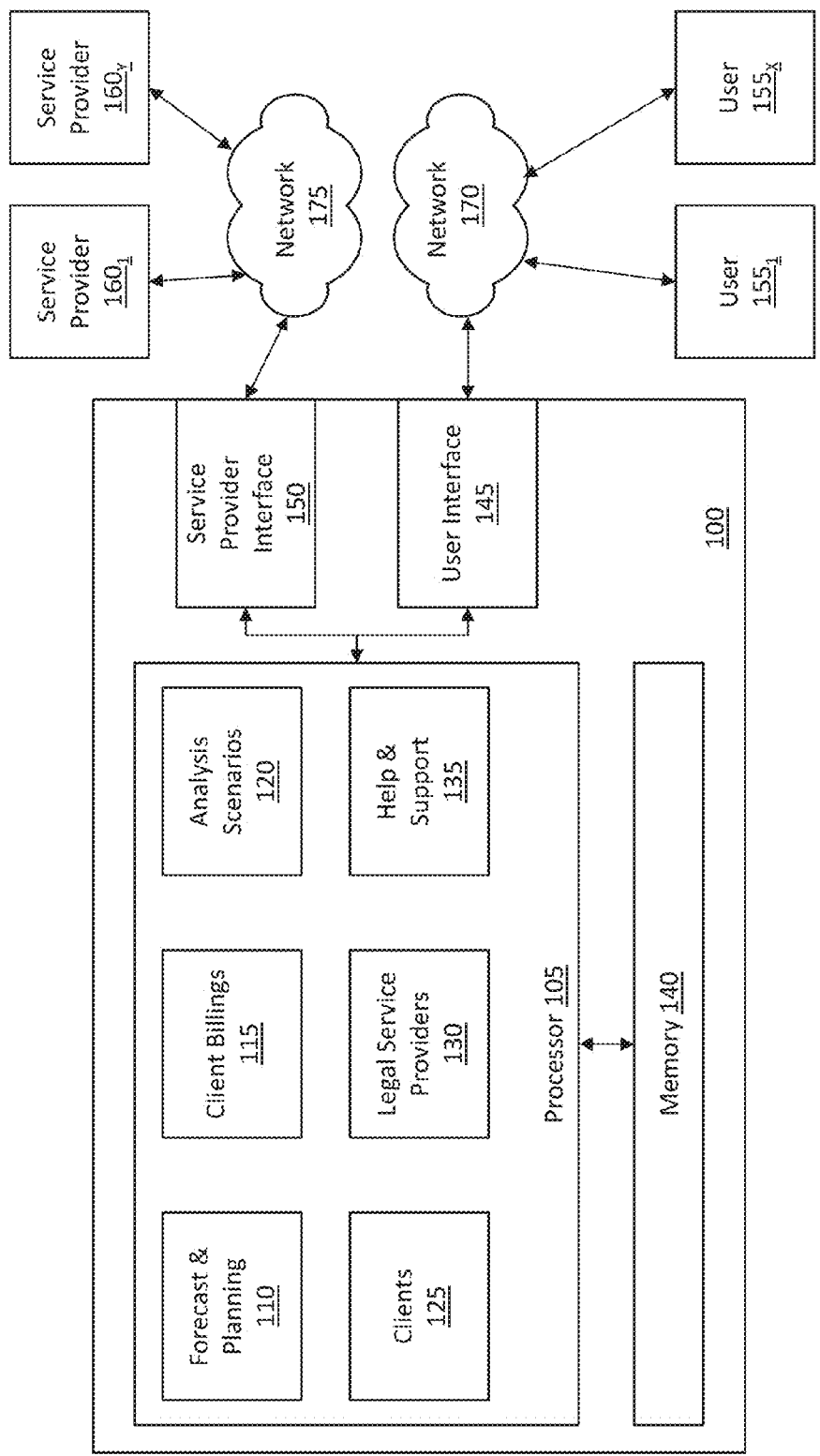
FIG. 1B is a schematic diagram of an exemplary system for providing the homepage and associated modules in accordance with the present invention.

Exemplary embodiments of the present invention provide an application for the analysis of professional service providers and comparative unit and/or ratio costs. Specifically, FIG. 1A illustrates an exemplary screen shot of a homepage of a software application in accordance with the present invention and FIG. 1B is a schematic diagram of an exemplary system for providing the homepage and associated modules in accordance with the present invention. As illustrated in FIG. 1A, the homepage of the exemplary application includes a number of modules, including a "Forecast and Planning" module, "Client Billings" module, "Analysis Scenarios" module, "Clients" module, "Legal Service Providers" module, and "Help and Support" module.

The "Forecast and Planning" module provides the ability to determine the projected scope and cost of a new matter based on unit- or ratio-cost driven activity assumptions regarding the work to be performed. This module also captures and tracks matter-specific background information such as: "type of matter," "priority," "description," "jurisdiction," "complexity" and "keywords." This matter-specific information forms the basis of comparison against the database to identify similar matters for purposes of providing comparative unit cost or ratio cost information. The comparative unit cost or ratio cost information is identifiable by specific matters) if it is the company's own data, and is presented in aggregate, blinded format (not identifying specific matters or clients) if it is broader industry data from other companies.

The "Client Billings" module provides access to the raw billing information provided by companies or legal services providers. The "Analysis Scenarios" module enables a user to analyze key performance ratios and unit cost or ratio cost figures generated from the raw billing information contained in the "Client Billings" module.

The "Client" module enables a user to track information about the various clients or companies who have caused billing information to be loaded into the system for analysis by that user. The "Legal Service Providers" module provides access to a list of legal service providers, which can then be used to view billings and cost patterns for each of the legal service providers for specific matters. The "Help and Support" module links to information explaining how to use the various modules and features of the software application.

As illustrated in the schematic of FIG. 1B, a computer 100 includes a processor 105, memory 140, user interface 145 and service provider interface 150. Processor 105 has software modules 110-135 corresponding to the modules illustrated in the home page of FIG. 1A. These software modules can be loaded into processor 105 from memory 140.

A user interface 145 allows users $155_1$-$155_X$ to access the system through network 170. The system also includes a service provider interface 150 allowing service providers $160_1$-$160_Y$ to access the system via network 175. Although FIG. 1B illustrates separate interfaces and networks for service providers and users, a single interface and/or network can be employed. Network 170 and/or 175 can be any kind of network, including an intranet, extranet and/or the internet. The application of the present invention can be a thin-client application where the application executes on one computer and is accessed by a remote computer and/or it can be a fat-client application that executes on the same computer from which it is accessed. When the application is a fat-client application, one or more input devices (not illustrated), such as a keyboard, mouse, pen input, etc., can be directly connected to computer 100, and one or more output devices (not illustrated), such as one or more displays, printers, etc., can be directly connected to computer 100.

Figure 10A:
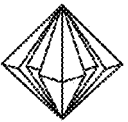
Figures 2, 10C:
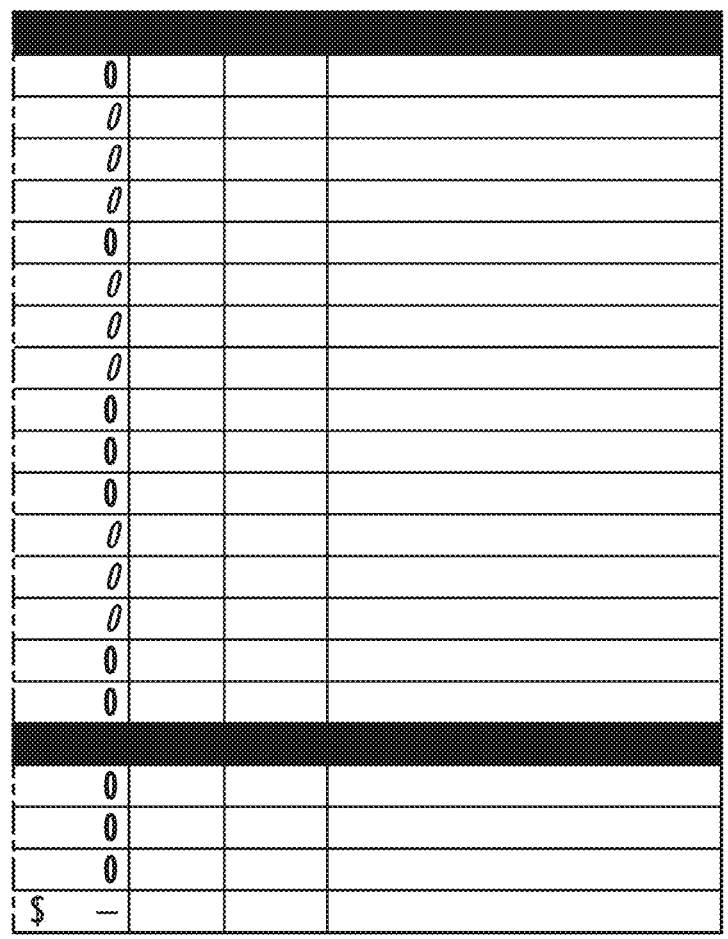

FIG. 2 is a schematic diagram of an exemplary system providing the back-end processing of the present invention. The system includes a number of inputs that are fed into a pre-processing validation and analytics component 230 and/or comparative and cost model analysis component 235. Components 230 and 235 can be embodied as software stored in a non-transient memory and executed on one or more processors, such as processor 105.

Historical data stored in database 205, which includes historical billing records, is fed into both the pre-processing validation and analytics component 230 and comparative and cost model analysis component 235. Database 205 can be any type of non-transient storage medium, such as memory 140. One or more electronic billing (E-billing) system feeds $210_1$-$210_Z$ are provided to pre-processing validation and analytics component 230. The information from the electronic billing system feeds represents current, real-time billing information, or historical, past billing information. Once the electronic billing system feed is processed by pre-processing validation and analytics component 230, it is stored in historical data database 205.

Depending upon implementation, the historical billing data can include billing data for a single company, billing data for a number of companies, billing data for a single user for a single company/legal service provider, billing data for a number of users of a single company/legal service provider, billing data for a number of users for a number of companies/legal service providers, aggregated billing data for a single industry, aggregated billing data for a number of industries and/or the like. Depending upon implementation, the outputs based on billing data generated by other companies or legal service provider can be blinded (e.g., the narratives, billers, legal service provider names, etc.) can be removed to protect any confidential information residing in the billing; data. In addition to the inputs illustrated in the figure, components 230 and 235 can receive budgets/completed forecast templates, which are either uploaded using an external mechanism (e.g., a spreadsheet sent by e-mail or uploaded to an FTP site) or input directly into the system using the provided user interface.

Legal metadata and models 215, industry metrics 220 and legal matter cost model 225 are fed into the comparative and cost model analysis 235. Legal metadata and models 215 relate to matter-specific attributes of various matters in the database (such as: "type of priority," "description," "jurisdiction," "complexity" and "keywords."), which may be queried and filtered to identify and juxtapose similar and/or disparate matters for analytical comparisons.

Industry metrics 220 represent accumulated data patterns from within the database concerning cost and performance, which may be queried and filtered to identify similar and/or disparate cost components for analytical comparisons. The legal matter cost model 225 includes a customized subset of data crafted for a particular company or client to show the expected range of unit cost (e.g., cost per deposition), unit volume (e.g., number of depositions) and other values that the company or client would expect see on that particular type of legal matter, based on the mathematical/algorithmic assessment of historical trends in prior matters of that type. Comparative and cost model analysis component 235 also receives analysis constraints 240, legal matter execution plan and updates 245, legal matter cost metrics 250 and legal service provider scorecard 255, all or some of which are used to generate information for output device 260, which can be a display and/or a printed output. As used herein, the term legal service provider includes law firms (in any form), solo practitioners, vendors, etc. To the extent that the description below specifically reference law firms or firms connection with particular analysis, graphs, etc., these references should be understood as non-limiting examples and the description is equally applicable to any type of legal service provider.

Pre-processing validation and analytics component 230 analyzes the information from historical data database 205 and the billing information from the electronic billing systems 210₁-210_Z to identify any omissions or inaccuracies the information, and also to determine unit cost, ratio cost and/or flag data for a secondary assessment. An exemplary method for the pre-processing and validation of billing data is illustrated in FIG. 3. Although the method of FIG. 3 is described below in connection with historical billing data, the method can also be performed using information received from an electronic billing system feed to validate and analyze billing data as it is received from the legal services providers. Further, as described above and below, the method can also employ other types of pricing information and accordingly can receive budgets/completed templates and/or price quotes for processing by the method illustrated in FIG. 3.

Initially, component 230 receives historical billing data (step 305) and analyzes the data to identify incorrect entries (step 310). In accordance with exemplary embodiments of present invention, the billing data will include time entries having both a task code and a corresponding narrative description of the work performed. The American Bar Association (ABA) Uniform Time Billing Management System (UTBMS) defines task codes that can be employed to categorize various legal tasks under general task categories, which are then associated with a number of specific tasks under those categorizes. For example, the UTBMS task codes for litigation divide tasks under five broad categories, including L100 for "Case Assessment, Development and Administration", L200 for "Pre-Trial Pleadings and Motions", L300 for "Discovery", L400 for "Trial Preparation and Trial", and L500 for "Appeal". Each of these general categories has a number of associated task codes for specific tasks, such as the L100 "Case Assessment" category including L110 for "Fact investigation and Development", L100 for "Analysis and Strategy", L130 for "Expert and Consultant Work", etc. The current UTBMS task codes categories and associated task codes are well-known and are reproduced in FIGS. 5A and 5B, which will be described in more detail below. Although the present invention is described in connection with task codes for litigation, the present invention can employ any type of UTBMS task codes for other types of legal work, and indeed is equally applicable to any task code scheme for the provision of professional services. Further, it should be recognized that task codes are simply one type of task identifier and any other type of task identifier can be employed with the present invention.

Validation of a time entry involves comparing the type of work defined for any particular task code against the narrative for the corresponding time entry to determine whether it was coded appropriately. Any inappropriately coded time entries can then be corrected and/or re-categorized with the appropriate task code (step 315). For example, a time entry with a task code L110 and a narrative of "Telephone conference with Ms. Jones to determine suitability as an infringement expert." would be flagged as a miscategorized time entry because it should have been coded with the L130 task code for experts/consultant-related work. Although not illustrated, miscategorized time entries for which the appropriate task code cannot be determined may also be flagged for manual review and correction.

To the extent that the billing data includes non-conforming time entries, such as a lack of task code or narrative, and/or when it is not possible to determine the correct category for one or more time entries, these time entries can be removed from the analysis and then once all of the other billing data is analyzed, the removed entries can be added back into the other billing data using statistical sampling, i.e., on a percentage basis. Thus, if the other billing data includes 30% of the total time being spent in the L100 "Case Assessment" category, 30% of the time associated with the removed time entries can be allocated to this category. If desired, this can be performed on a more granular, task-basis such that if 10% of the other time entries are for the L110 "Fact Investigation and Development" task code, then 10% of the time associated with the removed time entries can be allocated to that task.

Exemplary embodiments of the present invention perform analysis of professional service providers by grouping tasks based on a task identifier (e.g., a task code) and analyzing the amount of time/money spent on any particular task for a particular matter and/or a group of matters. Accordingly, once the historical billing data has been corrected, common tasks among the historical billing data are identified using the task codes (step 320), and then the historical billing data is analyzed to calculate the corrected/adjusted unit cost, ratio cost and/or a secondary assessment (step 325) and then the results of the analysis are stored (step 330).

Cost per activity can be calculated in a number of different ways, such as simply the total cost entered with a particular task code, or the total cost entered with a particular task code divided by the number of units associated with the task, the latter of which will be described in more detail below. Ratio cost is the amount charged for a particular task code compared to the total amount charged for a matter. Secondary assessments are a subset group of ratio analyses with respect to task codes that individually are not primary drivers of costs, but which taken together can represent significant expenditures. Viewed together in context, secondary assessments can track aspects of performance in a more time-effective sways.

Figure 4:
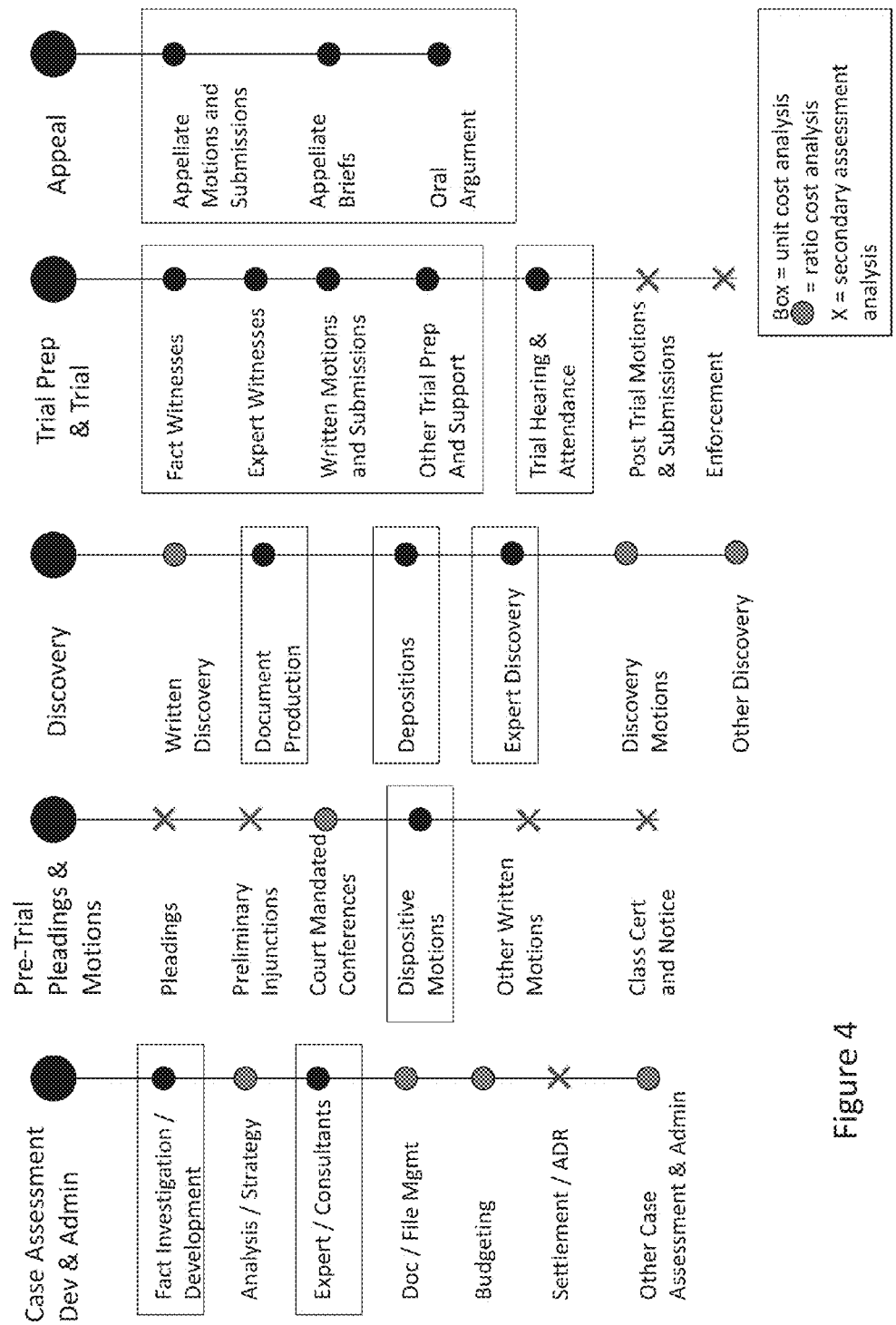
FIG. 4 is a diagram illustrating the different types of analysis performed for different tasks in accordance with exemplary embodiments of the present invention.

It is not always appropriate and/or necessary to perform a unit cost measure for all tasks. Thus, for example, FIG. 4 illustrates the different types of analysis performed for a number of different tasks for a litigation, broken down by UTBMS litigation task code categorizes. In FIG. 4 the litigation code categories are listed across the top and the text below that rectangle represents individual task codes for each category. The tasks surrounded by the rectangles are subject to unit cost measures, while those tasks with a lighter shaded circle are subject to a ratio cost analysis, and the tasks associated with an X are subject to secondary assessment.

FIGS. 5A-5D illustrate the different types of analysis that can be perforated for different tasks coded with the UTBMS litigation codes. Although the task codes and task definitions in these figures are known in the art, the corresponding report/analysis are features of the present invention. As illustrated in FIG. 5A, for time entries under task code L130 the per unit cost for expert assessment/development is calculated and a combined "omnibus expert cost" metric is calculated by analyzing the time entries under this task code plus those under L340 (which is for expert discovery) and dividing this sum by the number of experts. Similarly, the time entered under L240 "Dispositive Motions" task code can be divided by the total number of dispositive motions, and can also be aggregated with time entries under task codes L520 and L530 and divided by the total number of motions, briefs on appeal and oral arguments on appeal to provide a motions, briefings and argument analysis. Although FIGS. 5A-5D illustrate exemplary analysis for particular tasks, other analyses can be performed, as appropriate.

Another aspect of the present invention is the ability to perform comparative cost analysis and pricing based on a variety of different types of pricing information. This pricing information can include historical data, price quotes for new work, and budget proposals. It should be recognized that price quotes includes bids for new work (which can include a commitment by the organization receiving the bids to hire one of the bidders), but also includes non-binding service estimates that can be selected based not only on the lowest cost submission but also considering other non-monetary considerations. As used herein the term "budget proposal" refers to a submission by a law firm that has already been selected to handle a matter, whereas the term "price quote" refers to a submission by a law firm for a particular matter when a particular law firm has not yet been selected for the particular matter. It should be recognized that the terms budget proposal and price quote are sometimes used in the art interchangeably. Regardless of the actual nomenclature, a price quote that is a submission by a law firm that has already been selected to handle a matter is encompassed by the term "budget proposal" in the present application and a budget proposal that is a submission by a law firm for a particular matter when a has not yet been assigned to the particular matter is encompassed by the term "price quote" in the present application.

Referring again to FIG. 2, the comparative cost analysis and pricing based upon historical data would employ the historical data in database 205, legal metadata and models 215, industry metrics 220, legal matter cost model 225. Pricing information that are price quotes for new work or budget proposals can be input via, for example, legal matter execution plan and updates 245. It will be recognized that when pricing information other than historical billing data is employed, such as price quote for new work and/or budget proposals, it is this other pricing information that will be processed in steps 305-330, instead of, or in addition to, the historical billing data discussed above.

Once the pricing information has been processed in steps 205-330, us put analysis constraints 240 are received and applied against the data. Accordingly, referring again to FIG. 3, analysis constraints are received (step 335) and a cost model is generated based on the analysis results from step 325 and the analysis constraints (step 340). The generated cost model can be stored and/or output (step 345).

The analysis constraints define the scope of data used for the cost model, and the present invention can employ a variety of different types of constraints. One type of constraint is the scope of comparison so that it can be defined based upon the individual requester's usage patterns (i.e., the average price paid for a piece of work by the particular user), an organization's usage patterns (i.e., the average price a company has paid for a piece of work in the past), blinded usage patterns of broader markets of users in a particular industry (i.e., the industry market price for a piece of work), or blinded usage patterns of a broader industry (i.e., the price paid for the piece of work across multiple industries). Another analysis constraint can be whether the comparative data is limited to the user's active matters, the user's historical matters, or a blinded market sampling of similar active or historical matters of other users. Moreover, the analysis constraints be based upon project-specific or matter-specific criteria, such as geography, the nature of the project based upon the subject matter, the scope of the project based upon volume and/or complexity of the work to be performed and/or outcomes to be delivered, or the extent of specialized expertise or experience required of a potential service provider. Thus, it will recognized that the analysis constraints are used to filter the data that is included in the cost model and the data excluded from the cost model. For example, if a ratio cost was previously calculated and the analysis constraint that is employed is subject matter of the project then the ratio costs for matters involving the particular subject matter of the analysis constraint are selected for the cost model and the ratio costs for matters not involving the particular subject matter are excluded from the cost model.

Figure 6A:
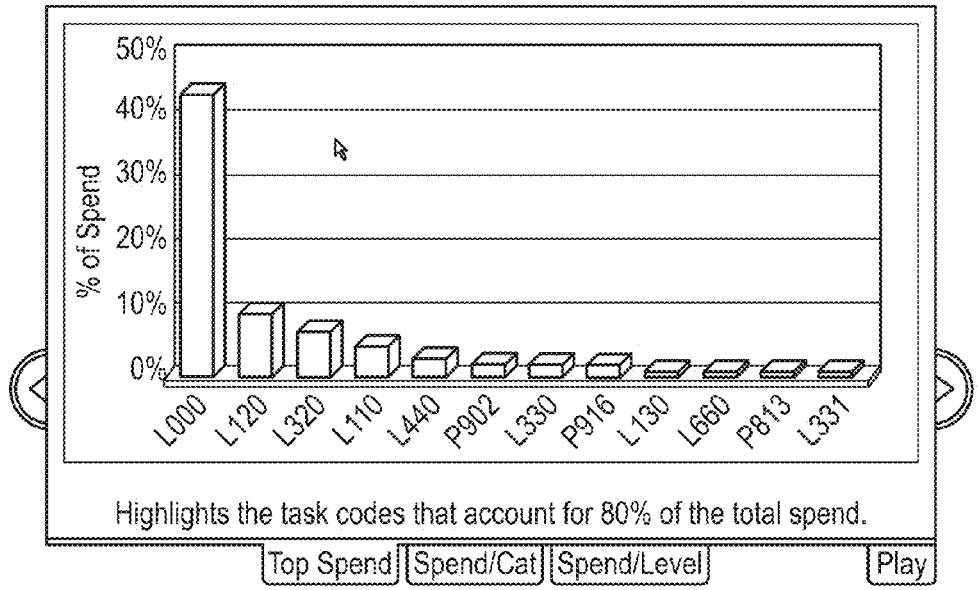
FIGS. 6A and 6B are graphs illustrating the percentage of total matter costs for each task code in accordance with exemplary embodiments of the present invention.
Figure 6B:
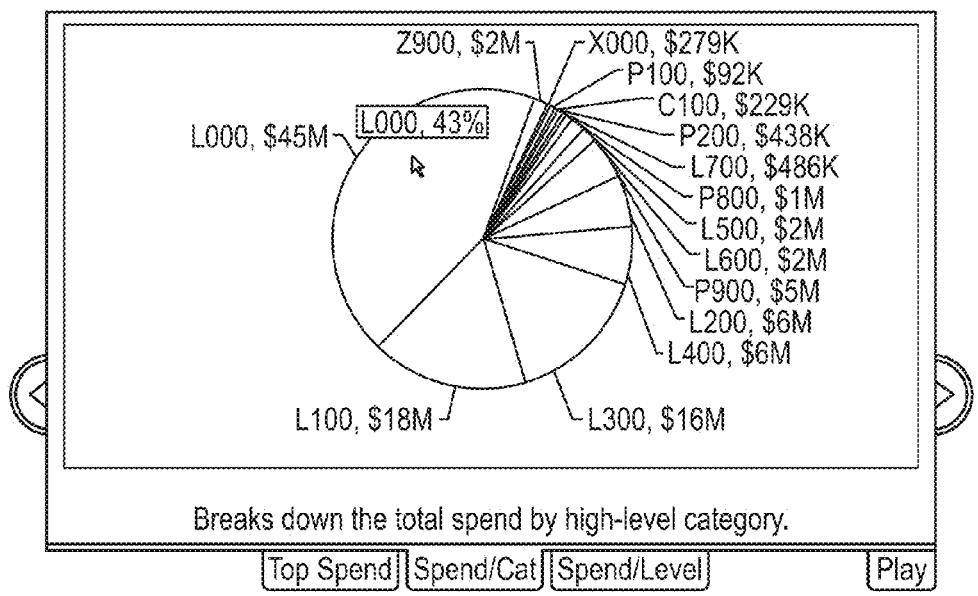
Figure 6C:
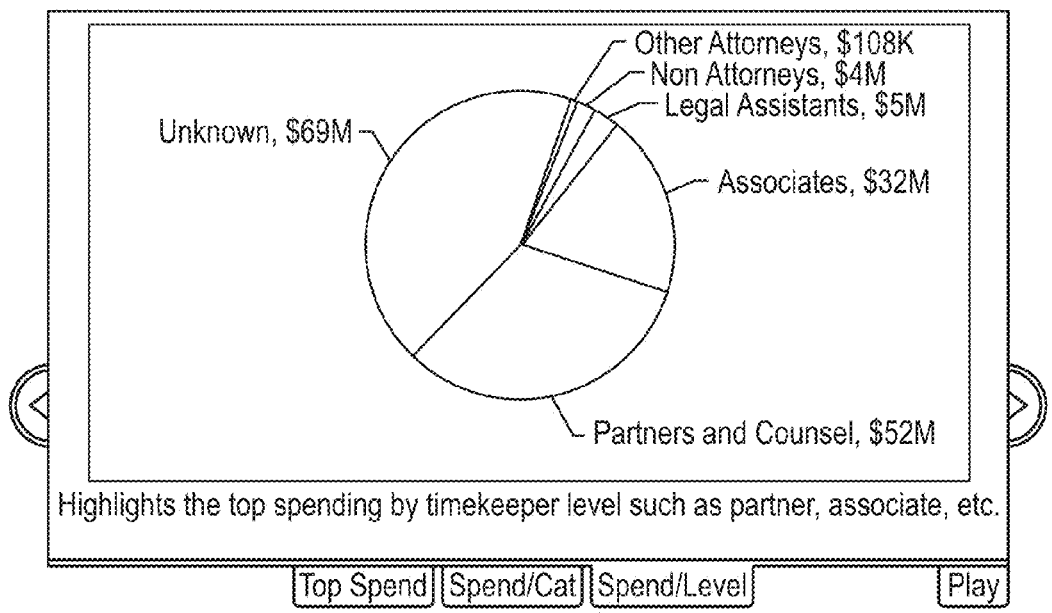
FIG. 6C is a graph illustrating the percentage of total matter costs by job title in accordance with exemplary embodiments of the present invention.
Figure 6D:
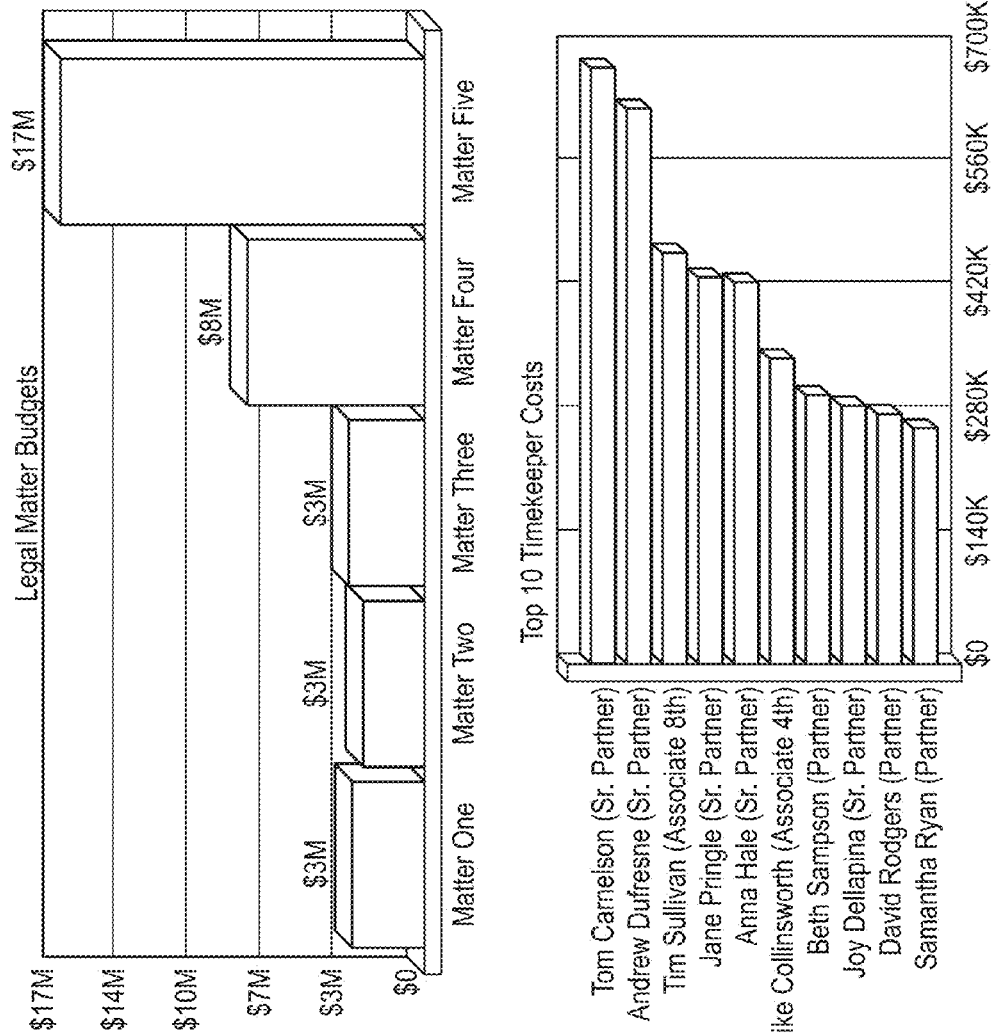
FIG. 6D are graphs respectively illustrating the legal matter budgets and top 10 timekeeper costs in accordance with exemplary embodiments of the present invention.

FIG. 6A illustrates the spend per task code as a percentage of the total spend on a particular litigation, as bar graph and FIG. 6B illustrates the percentage of spending per task code across an entire litigation as a pie chart. The graphs in FIGS. 6A and 6B highlight the tasks that consume the most costs for one or more litigations, depending upon the selected analysis constraints. FIG. 6C illustrates the percentage of spending for a particular litigation by time keeper job title, such as partner, associate, legal assistant, etc., as a pie chart. FIG. 6D illustrates an upper bar graph representing the total budget per matter a lower bar graph of the total costs per timekeeper.

It should be recognized that depending upon the selected analysis constraints, the graphs in FIGS. 6A-6C can represent billing data from a single matter for a particular company, a number of matters for a particular company, a number of matters for different companies, a single legal provider's billing data and/or billing data for a number of legal services providers. Additionally, multiple versions of the same graphs, based on different constraints, can be output for a side-by-side comparison. Thus, for example, a user can request the generation of two of the bar charts of FIG. 6A to be output, each representing the costs for different legal services providers, different matters, etc.

Although the graphs of FIGS. 6A-6C divide total costs into different categories, these graphs do little to inform the understanding of what is driving these costs or whether these costs are money well spent. Thus, the fact that the L120 "Analysis/Strategy" category consumes the highest percentage of categorized costs (L000, the highest percentage represents uncategorized costs), as illustrated in FIG. 6A, is unsurprising and tells one little about the underlying costs. Similarly, referring to FIG. 6B, it is expected that the L100 "Case Assessment, Development and Administration" task category consumes the largest portions of overall costs. Likewise, referring to FIG. 6C, it is to be expected that the partner/counsel category consumes the largest amount of overall costs because these two categories of attorneys have the highest billing rates. Finally, although the upper graph in FIG. 6D provides a comparison of the legal budget between different matters, the complexity these matters may vary greatly, which contributes to the different budgets; and the comparison of total costs per time keeper in the lower graph is ambiguous as to the contributing factor of the costs—it could represent a modest contribution in terms of hours by a person with a high billing rate or a large contribution in terms of hours by a person with a relatively average billing rate.

Figure 7A:
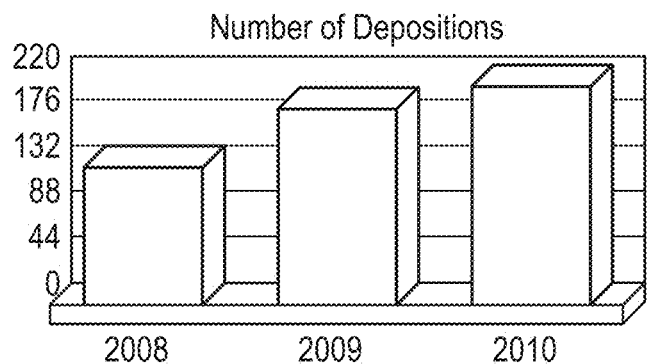
FIGS. 7A-7E are graphs illustrating the results of unit cost analysis for depositions in accordance with exemplary embodiments of the present invention.
Figure 7B:
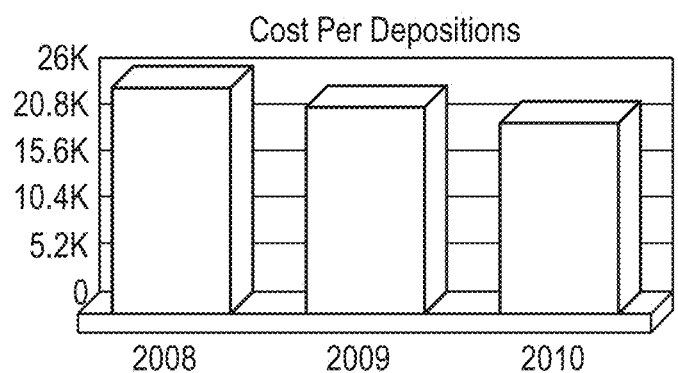

In contrast to the graphs of FIGS. 6A-6D, the graphs of FIGS. 7A-7E and 8A-8L illustrates the significant advantages provided by the unit cost or ratio cost analysis of the present invention. Specifically, the graphs of FIGS. 7A-7E respectively represent the number of depositions per year, average cost per deposition per year, the total deposition spend per legal service provider in a particular year, the average deposition cost per legal service provider in a particular year and the deposition cost per matter (classified by complexity). Thus, a comparison of the bar graphs of FIGS. 7A and 7B illustrates that while the number of depositions are rising, the average cost per deposition is falling. Accordingly, while a simple comparison of the year-to-year costs for the L300 "Discovery" task category and/or the L330 "Deposition" category may show little variance because the rising number of depositions is offset by the lower per deposition costs, the graphs in FIGS. 7A and 7B illustrate what could be a significant shift in the underlying drivers of these costs. Someone reviewing the unit cost or ratio cost data can then determine whether it would be possible to reduce the L330, and in turn the L300, costs by controlling the number of depositions or the cost per deposition.

Figure 7C:
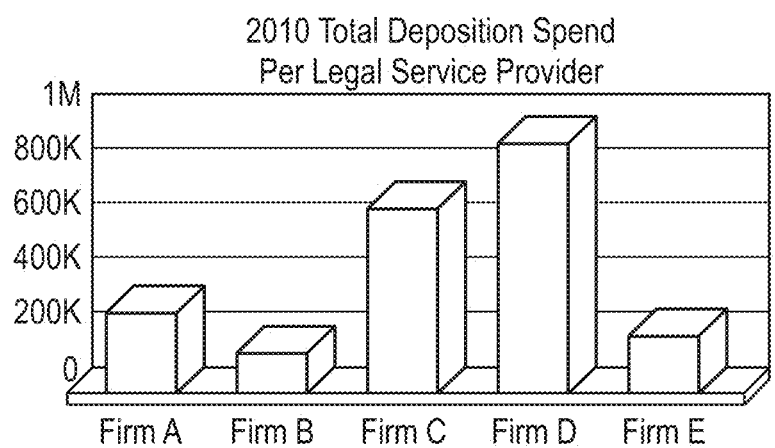

Similarly, the graph in FIG. 7C allows one to identify the legal service providers that are more efficient in conducting depositions, and when compared to the graph of FIG. 7B allows one to easily see the legal service providers that have above or below average cost per deposition.

Figure 7D:
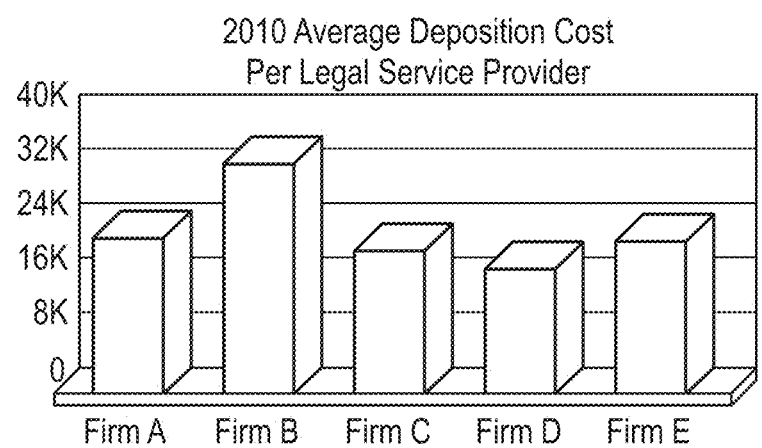
Figure 7E:
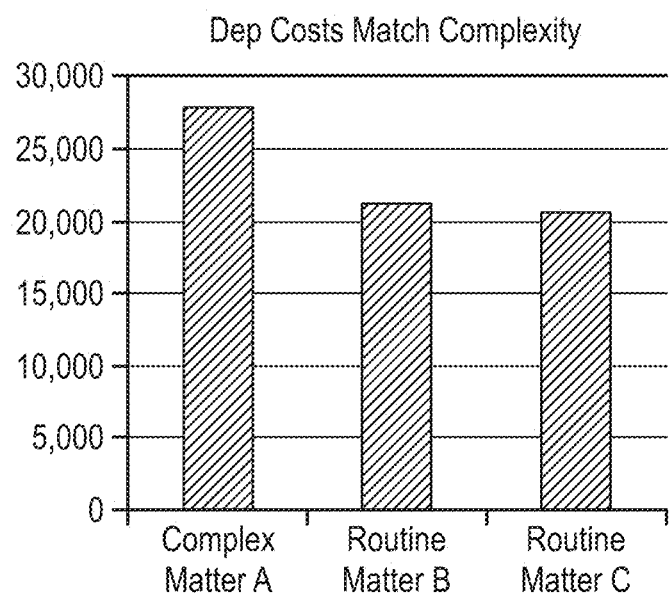

The graph in FIG. 7D provides a starting point for determining whether to pursue unit cost or ratio cost analysis. In particular this graph only shows the total deposition spend per legal service provider, but not what is driving this cost. FIG. 7E illustrates that the deposition costs are aligned with the complexity of the matters, which is to be expected.

FIGS. 8A-8L are additional graphs illustrating the usefulness of the unit cost or ratio cost analysis of the present invention. Thus, one could initially generate the graph of FIG. 8A to see the cost per fact witness deposition for a number of matters, and then generate the graph of FIG. 8B to see how legal service providers per fact witness deposition costs compare to the average costs. Similar analysis can be performed with the paired graphs of FIGS. 8C and 8D (respectively illustrating cost per summary judgment motion for different matters and different legal service providers), 8E and 8F (respectively illustrating cost per company expert for different matters and different legal service providers), 8G and 8H (respectively illustrating cost of L120 "Strategy" task code as a percentage of total matter cost for different matters and different legal service providers), 8I and 8J (respectively illustrating the percentage of total costs consumed by administrative task codes for different matters and different legal service providers), and 8K and 8L (respectively illustrating the percentage of total costs consumed by "Other" task codes for different matters and different legal service providers). Although these are described as "paired graphs", it is not necessary to generate both graphs. Additionally, these graphs can be generated in the opposite order from that described or generated simultaneously.

Accordingly, because the present invention calculates unit costs, graphs can be generated illustrating the number of depositions for a particular legal service provider and the average cost per deposition for that firm; the number of depositions for all legal service providers and the average cost per deposition each of these legal service providers. Additionally, the underlying data can easily be accessed, for example using the data input into the form of FIG. 10B or 11D (described in more detail below) to identify number of depositions and average cost per deposition for a particular matter. Moreover, the present invention can provide a "mouse-over" feature that produces a text box describing the number of depositions and average cost per deposition when a cursor (or mouse pointer) is moved over any one of the bars of this graph.

Figure 8A:
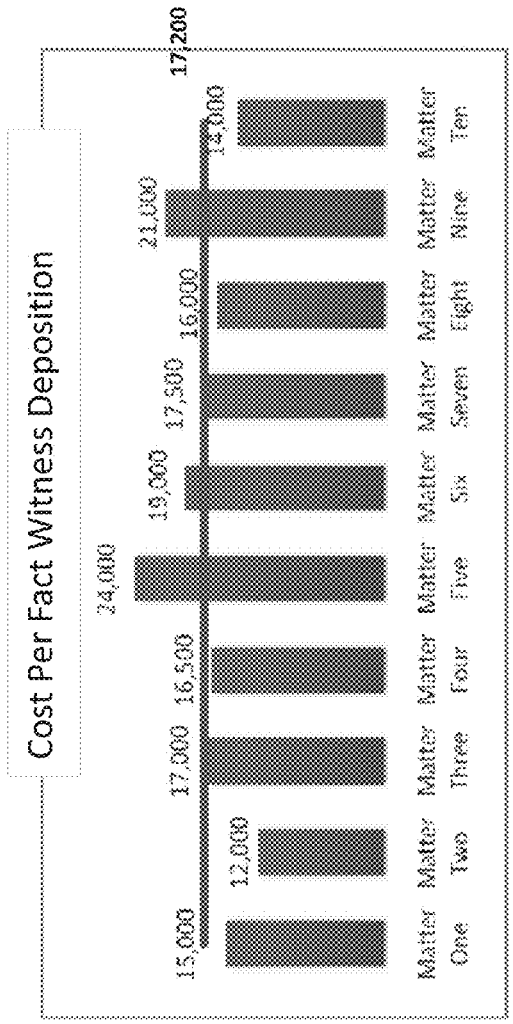
FIGS. 8A-8L are graphs illustrating the results of unit cost and/or ratio cost analysis in accordance with exemplary embodiments of the present invention.
Figure 8B:
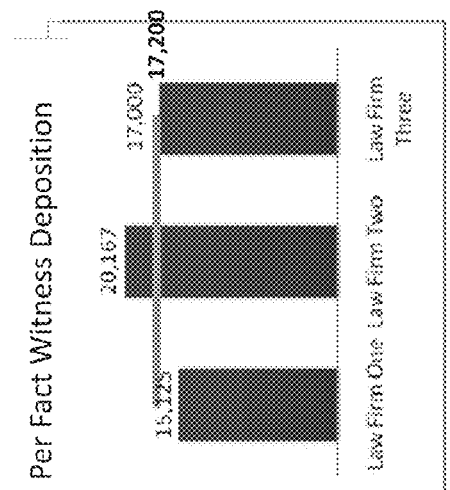
Figure 8C:
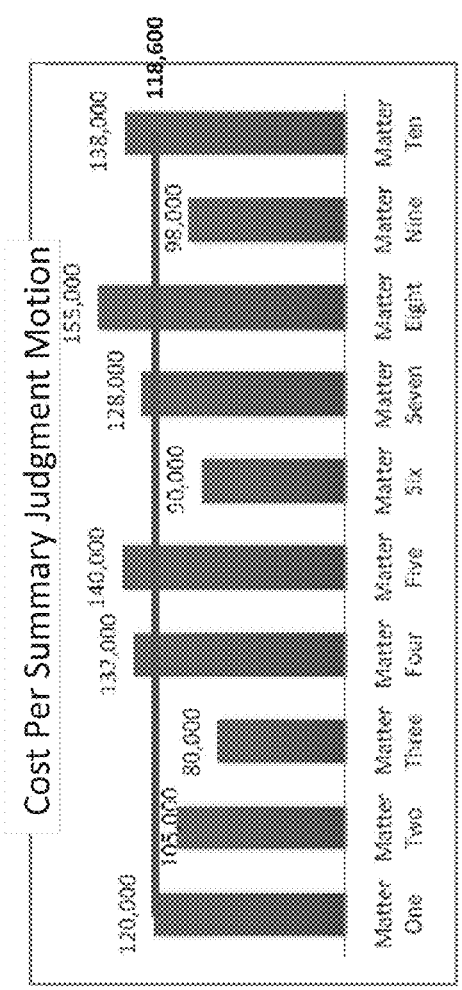
Figure 8D:
Figure 8E:
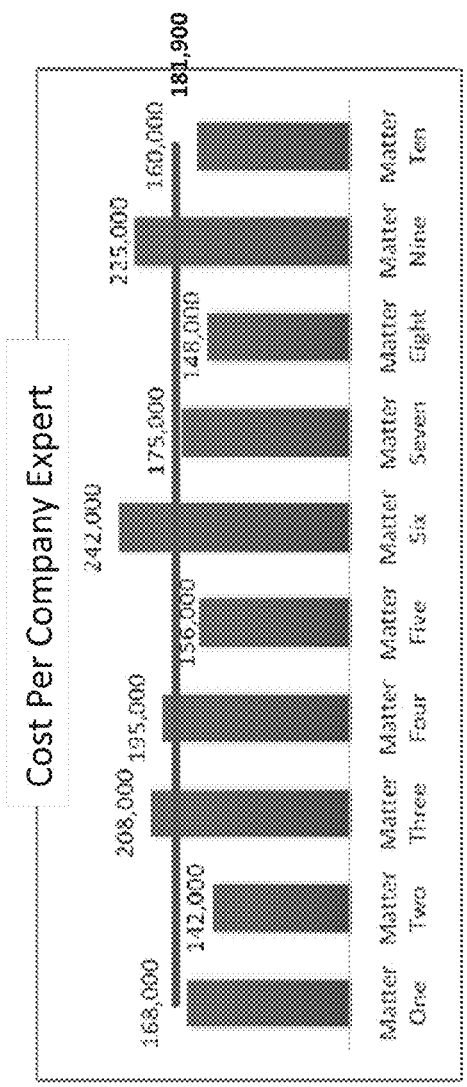
Figure 8F:
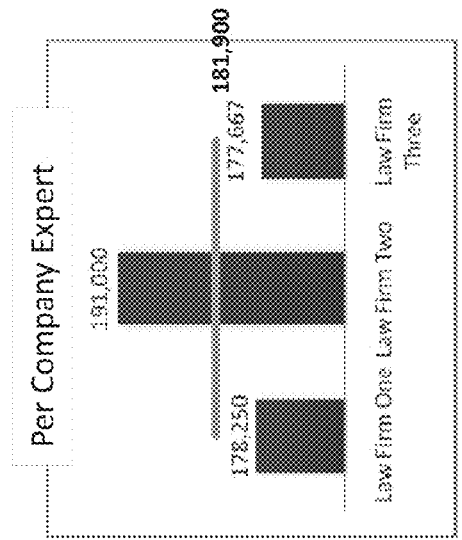
Figure 8G:
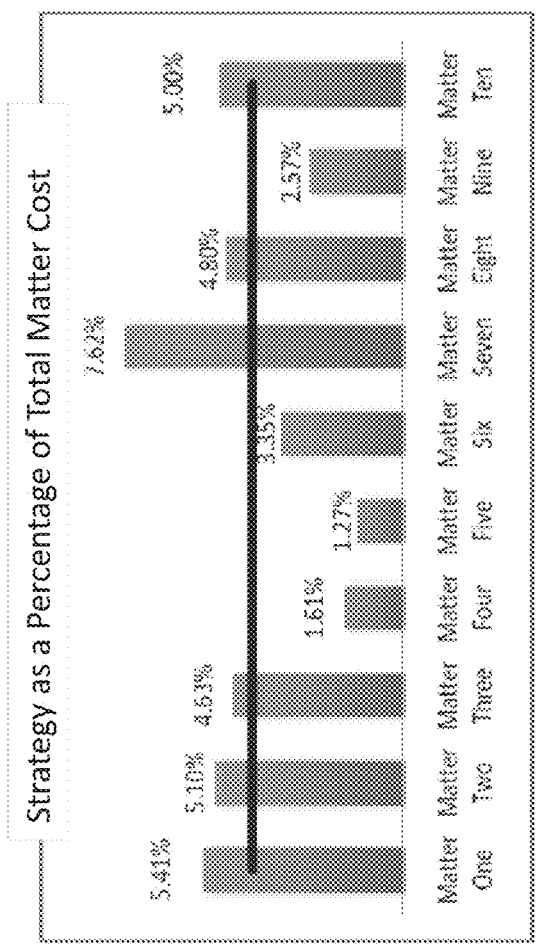
Figure 8H:
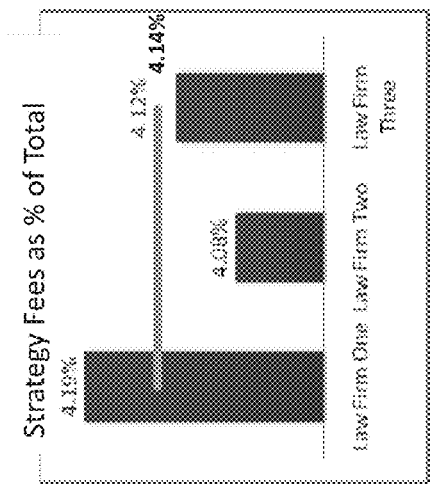
Figure 8I:
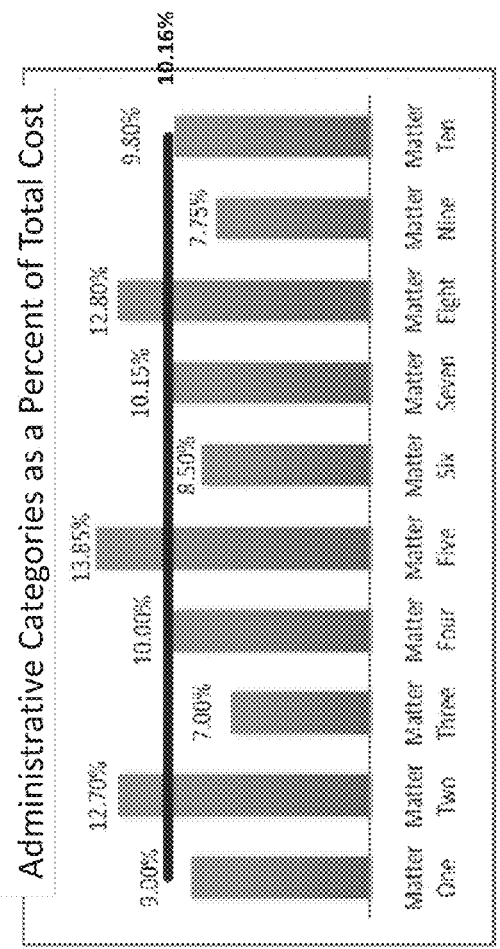
Figure 8J:
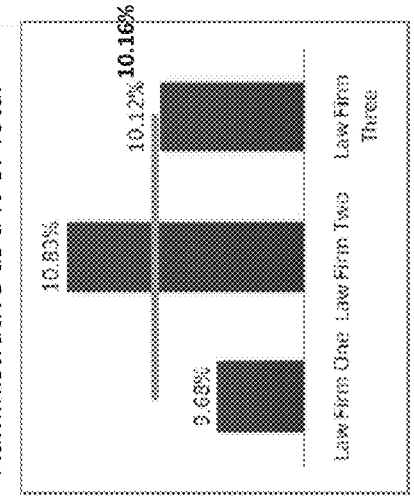
Figure 8K:
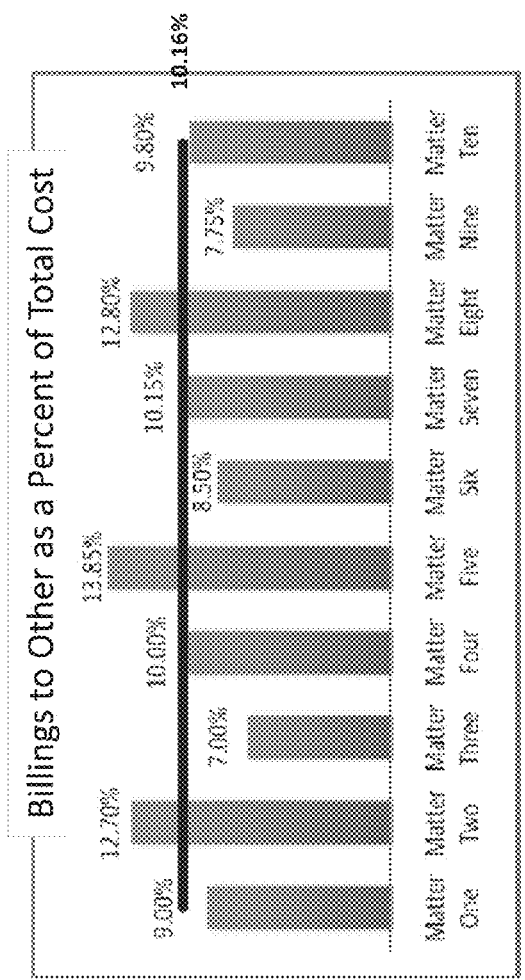
Figure 8L:
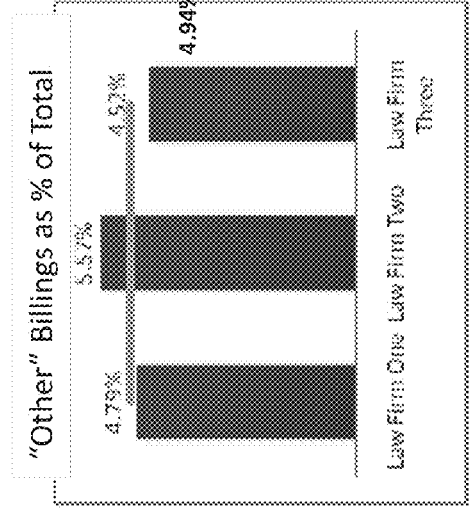

The graphs of FIGS. 8A-8L can be generated based on any user-selected constraint, so that, for example, the bar graph of FIG. 8A can reflect the cost per fact witness for all of the user's matters, for all matters of a single company, for all matters in a single industry or for all matters for all industries. Similar constraints can be applied to the other graphs discussed above.

Although the graphs of FIGS. 6A-6D, 7A-7E and 8A-8L are described here in connection with the historical billing data, these graphs can also be employed to display information about current billing data received or price quotes, for example, from electronic billing system feeds $210_1$-$210_Z$.

The cost models generated using the present invention are particularly useful in evaluating alternative fee arrangements (AFAs), which are becoming a popular alternative in the legal industry to being charged based solely on billable hours. Specifically, the cost model allows companies to compare an alternative fee arrangement to see if it is consistent with past costs for similar or different types of matters and/or consistent with similar unit cost or ratio cost prices in the broader market. Thus, a legal services provider submitting an alternative fee arrangement that is significantly below the past costs may be submitting the low price quote to capture the matter, and then would later seek to renegotiate for a higher fee once the matter has progressed, at which point it may not be viable to replace the service provider. The cost model component of the present invention helps to avoid that situation.

Figure 9:
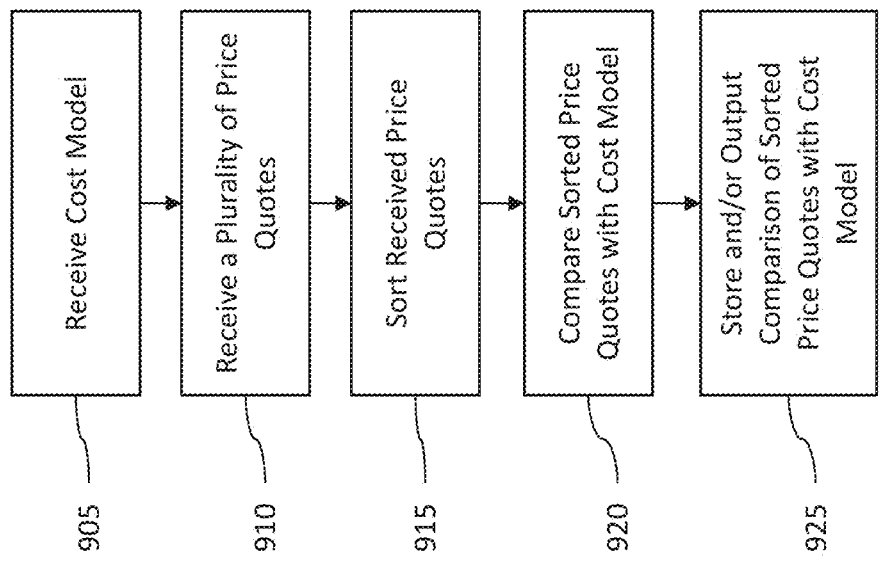
FIG. 9 is a flow chart illustrating an exemplary method for receiving a plurality of price quotes for a piece of work and comparing the price quotes to each other as well as to a cost model in accordance with exemplary embodiments of the present invention.

Another aspect of the present invention is the ability to receive a plurality of price quotes for a piece of work, and compare the price quotes to each other as well as to a cost model, such as the one generated in connection with the method of FIG. 3. An exemplary method for doing this is illustrated in FIG. 9. Initially, a cost model and a plurality of price quotes are received (steps 905 and 910). The plurality of price quotes are sorted and then compared with the cost model (steps 915 and 920). The comparison of the sorted rice quotes with the cost model can be stored and/or output (step 935).

The methods of FIGS. 3 and 9 can be used in a variety of different ways consistent with the description herein. For example, these methods can be used to compare a cost model generated using only historical pricing information with a plurality of price quotes for purposes of selecting a law firm to handle a particular matter. Further, these methods can be used to generate a cost model using historical pricing information and one or more price quotes and/or budget proposals and compare one or more of the price quotes and/or budget proposals with the generated cost model to evaluate how the price quote(s) and/or budget proposal(s) compare(s) to the cost model.

FIGS. 10A-10E illustrate exemplary mechanisms for receiving the price quotes for the services. The first page, which is illustrated in FIG. 10A, includes a number of fields for the legal service provider to complete, including client matter ID, matter name, matter description and legal service provider vendor name. The forecast total, expenses total, and staffing total figures are automatically generated using information provided in FIGS. 10B-10E.

In FIGS. 10B and 10C data is entered into the white cells only and data for the gray cells are automatically calculated. In FIGS. 10B and 10C a legal service provider would input the number of hours and blended rate for a variety of tasks, as well as start and end dates and any assumption and notes. As illustrated by the gray shaded boxes in FIG. 10B, the total amount is automatically generated using the combination of hours and blended rate. The blended rate column reflects the anticipated blended billing rate per task, which will vary from task to task depending upon complexity of the task. Thus, for example, the blended rate for L120 analysis/strategy would typically involve more senior attorneys billing at a higher rate than L320 document production work.

The unit quantity and unit cost columns represent a level of tracking beyond the conventional hourly rate approach. Unit quantity is employed for tasks that can be broken down by the number of anticipated units, such as the number of depositions with the L330 category. In other words, unit quantity represents how many of a particular item. Unit cost, however, is a measure of how much each item will cost on an "all-in" basis, factoring in related preparation, etc. Multiplying unit quantity by unit cost produces a per unit sub-total amount, which is a subset of the bolded "Total Amount" number above it, not in addition to it. Additionally, the "Other XXXX" sub-category tabulates the remaining portion of spending (if any) not captured in the per-unit subtotal. Thus, for example, the L130 "Experts/Consultants" task code requires input of the total number of hours and blended rate, which produces a total amount. The sum of the unit costs of the "Plaintiff Experts" "Defense Experts", along with "Other L130" should equal the product of the total number of hours and blended rate, i.e., they both produce the same "Total Amount". The "Other L130" can be subtracted from the "Total Amount", which can then be divided by the sum of the unit quantities of the "Plaintiff Experts" and "Defense Experts" to produce a value for the unit cost per expert.

Figure 10E:
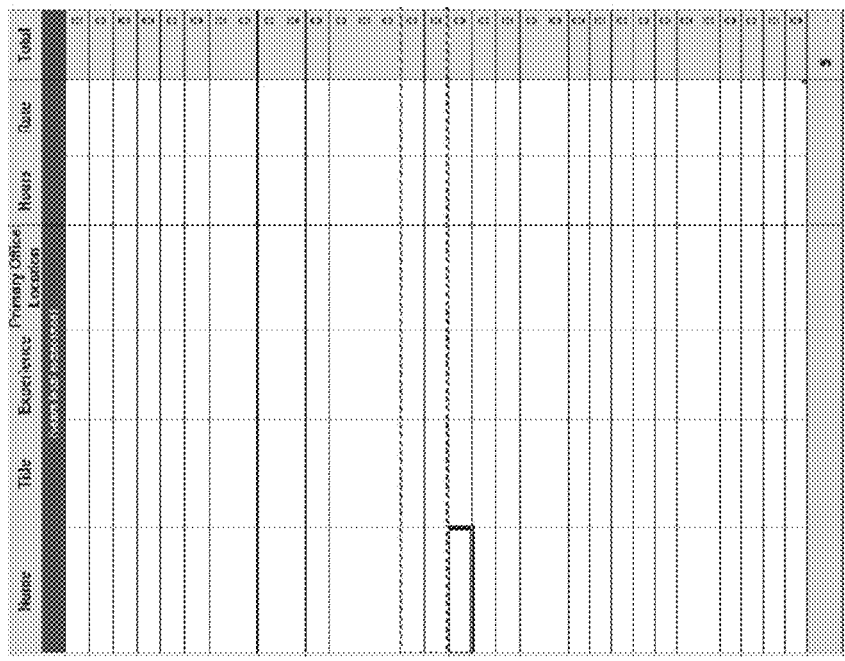
Figure 10D:
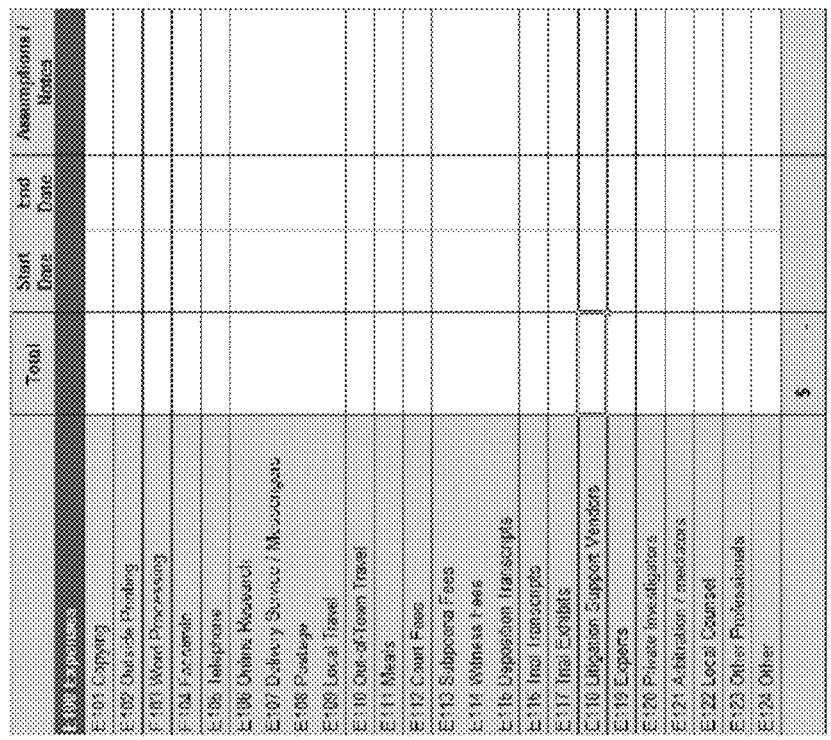

FIG. 10D illustrates the inputs for various expenses, coded according to the UMBTS expense codes, including a total amount of expenses, start and end date, and any assumptions/notes. FIG. 10E illustrates a mechanism for inputting a staffing plan including the name, title, experience, office location, expected hours and billing rate. Based upon the expected hours and rate, the total column is automatically calculated. The input mechanisms in FIGS. 10A-10E can be provided as a spreadsheet separate from the software application or can be integrated into the software application.

Using the cost models of the present invention allows a comparison of where different legal services providers are allocating their costs and what the costs represent on a per unit or ratio basis. Based on a cost model for historical billing data a user can easily identify any outlier or unrealistic assumptions in any of the price quotes, such as a low number of experts, a lose amount of costs for discovery, etc.

Figure 11A:
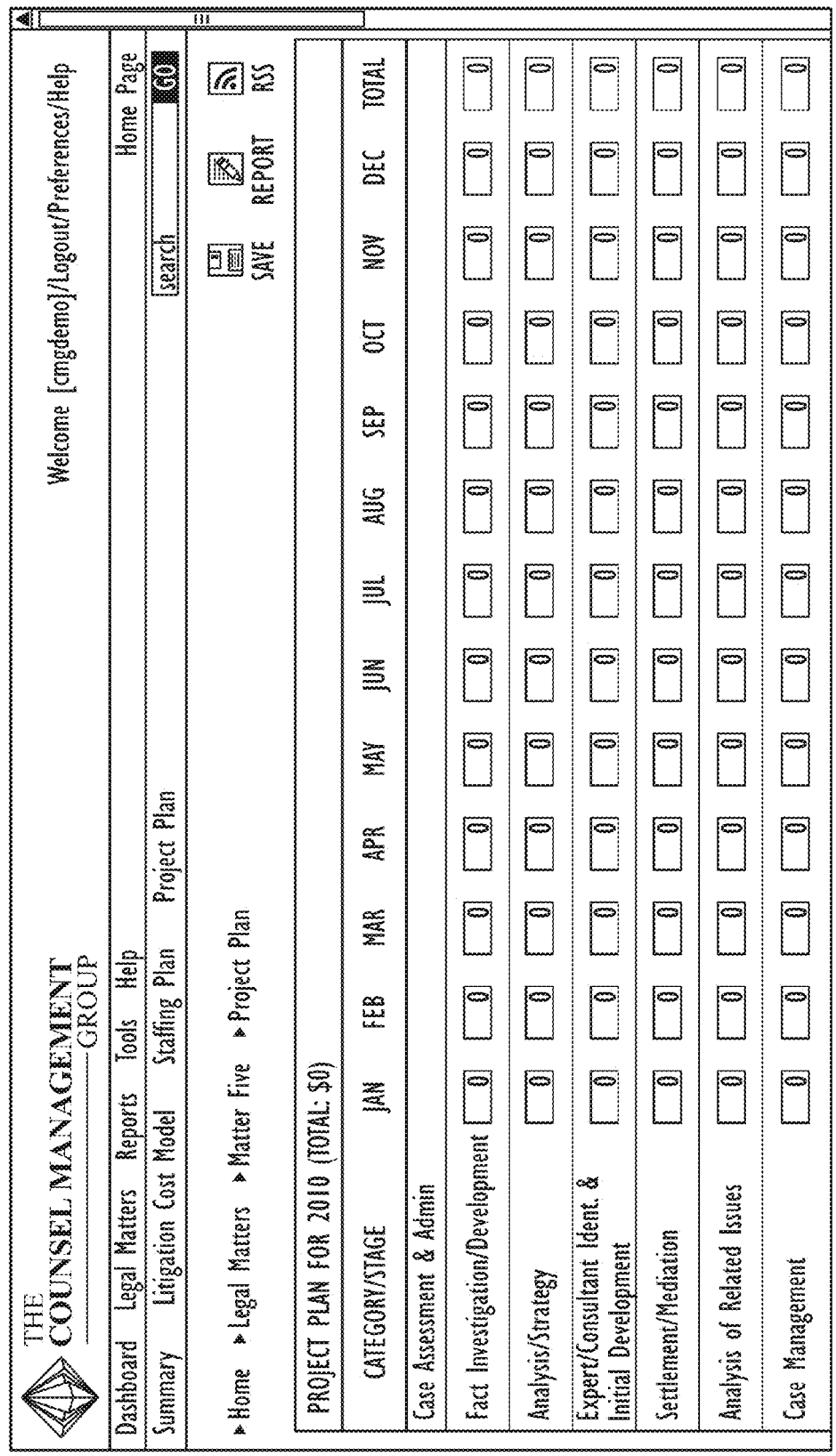
Figure 11D:
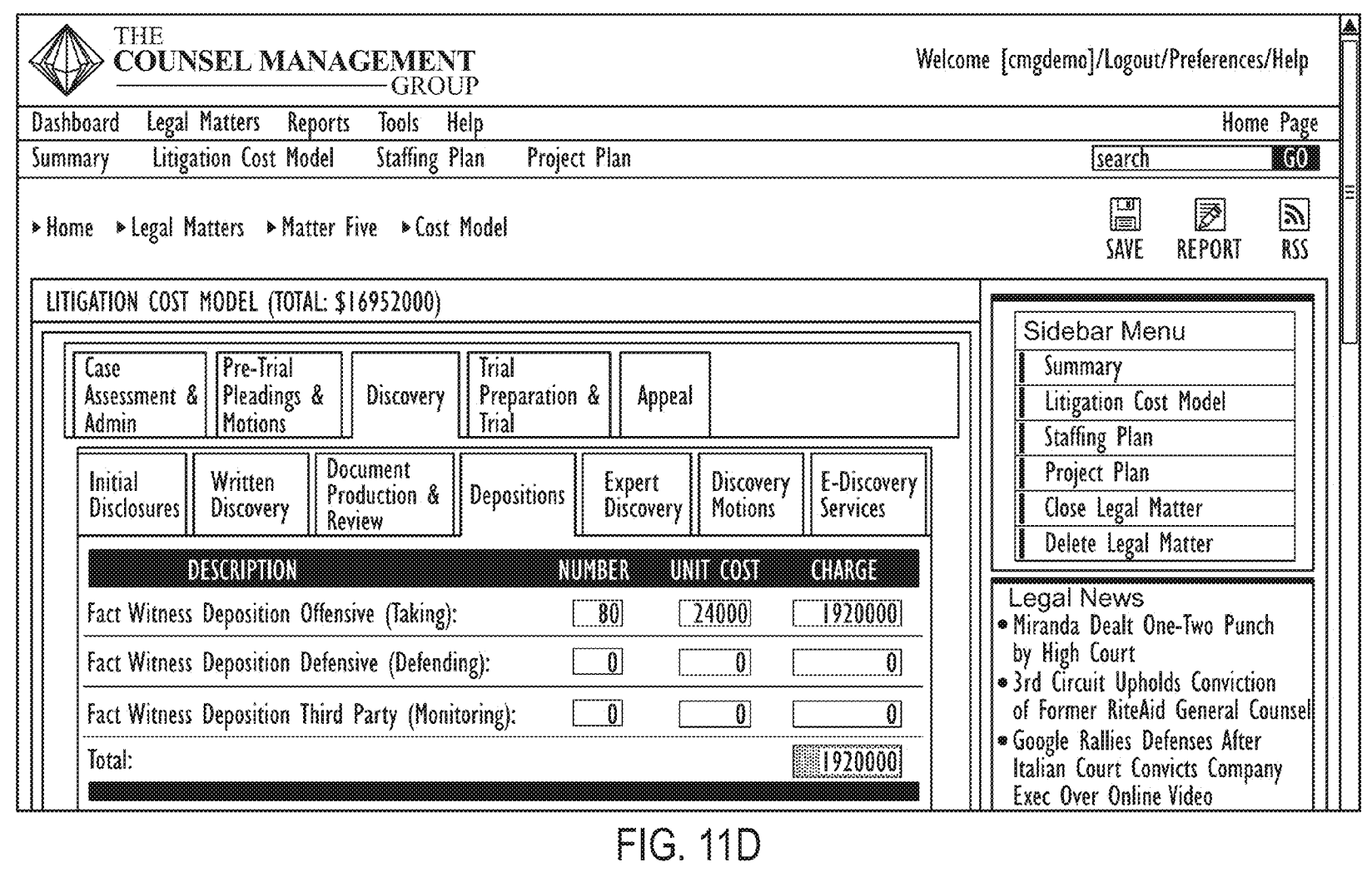

FIGS. 11A-11D illustrate exemplary alternative mechanisms for inputting a project and staffing plan data to that of FIGS. 10A-10E. Specifically, FIG. 11A illustrates a mechanism for inputting projected fees per month for each of the general topical areas for a litigation. The information input in the monthly columns is automatically totaled in the total column and updated in the total for the project plan at the top of the screen. FIG. 11B illustrates an exemplary staffing plan. The information in FIG. 11B can be generated using information from the winning price quote and/or using time sheets, such as that illustrated in FIG. 11C. Specifically, as illustrated in FIG. 11C, individual time sheets can be completed for each person working on the litigation, broken do by UMBTS task. FIG. 11D illustrates a legal service provider-wide or matter-wide per UMBTS task breakdown of the hours and unit costs for individual tasks. The information in the fields of FIGS. 11C and 11D can be imported from a winning price quote, and can also be updated after the winning price quote is selected, for example as the legal matter progresses. The present invention features different levels of functionality, enabling a client or company to request timekeepers' hours on a macro/matter level (FIG. 10E) or on a micro/task level (FIG. 11C). Either way, the system incorporates the timekeeper hour data into the project plan and budget, and tracks subsequent progress against these.

Figure 12:
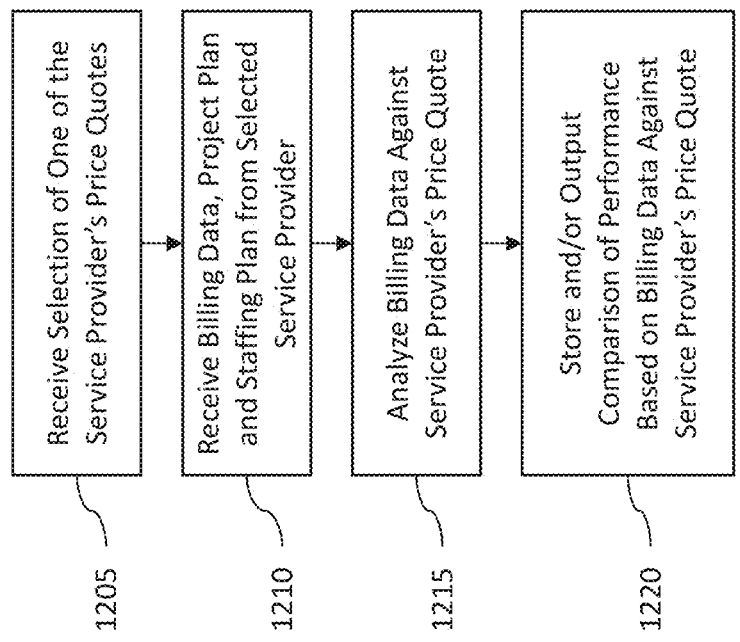
FIG. 12 is a flow chart illustrating an exemplary method for tracking a selected service provider's performance in accordance with exemplary embodiments of the present invention.

Another aspect of the present invention is the capability of tracking a legal service provider's performance with respect to financial, operational, and project management, as well as related markers of performance. An exemplary method for this is illustrated in FIG. 12. Initially, a legal service provider is identified for a particular matter (step 1205). Next, billing data, a project plan and a staffing plan is received from the selected service provider (step 1210). The billing data will be received on an ongoing basis, for example, a monthly basis, while the project and staffing plans may be input less frequently. Thus, the billing data, project and staffing plans may be input at different times. Accordingly, the present invention tracks progress against budget on a unit cost or ratio cost basis. The project and staffing plans can be input using the mechanisms illustrated in FIGS. 10A-10E and/or FIGS. 11A-11D.

The billing data and service provider's price quote are analyzed (step 1215), and the results of this analysis are stored and/or output as a performance comparison of the billing data against the service provider's price quote (step 1220).

Due to the time lag between the receipt of billing data and the final approval for payment, the underlying data employed in the method of FIG. 12 may be delayed for several months, for example if the report is run in June, the most recent approved billing data may be for February. Accordingly, the input mechanisms of FIGS. 10A-10E and/or FIGS. 11A-11D can be employed as an alternative, or in addition to, the electronic billing data. In this case, the relationship partner at the legal ice provider submitting the data provided by these input mechanisms can be required to certify the accuracy of this data using, for example, legal matter execution plan and updates mechanism 245.

It should be recognized that the total costs will likely vary between service providers. However due to the large volume of data used to produce the total costs, it is difficult to identify the reason for this variance. Accordingly, another aspect of the present invention is the disaggregation and apportionment of cost variance among multiple service providers in order to identify the underlying cause of the variance. This aspect apportions the variance across various domains such as rate variance (attributable to differences in hourly rates for time keepers at the same level), seniority variance (attributable to differences in staffing mix), and efficiency variance (attributable to difference in the assumed number of hours to be worked).

FIGS. 13A and 13B illustrate resulting graphs for unit cost variance in bar and pie graph form and FIG. 13C illustrates an exemplary formula for determining the unit cost variance. In particular, the present invention achieves the disaggregation and apportionment of cost variances by simultaneously tracking the unit cost figures for component projects and information about the assumed number of hours to be worked along with the blended hourly rate for such projects or tasks. This information is processed to assess the relationship among these various data points order to identify and depict the root cause of the cost variance, exemplary depictions being illustrated in FIGS. 13A and 13B.

The rate variance component is calculated by comparing rate totals for identical sample subset teams across various service providers. For example, a team of one senior partner, one fourth year associate, and one senior paralegal would cost x per hour at legal service provider ABC, and y per hour at legal service provider XYZ. The percentage delta between x and y is the basis for calculating the percentage of the unit cost variance attributable to the rate difference between these legal service providers.

The seniority variance is calculated by comparing the impact attributable to different staffing patterns with respect to the same unit or task across multiple legal service providers. This calculation involves four steps. The first step calculates the overall weighted hourly rates with respect to the legal service providers being compared in connection with the matters being analyzed. This is achieved by dividing the total hours into the total fees with respect to the entire matter. In the second step these overall weighted hourly rate figures are adjusted to account for the rate variances described above. In particular, the weighted hourly rate figures are adjusted up or down by a percentage multiplier reflecting the delta attributable to the different hourly rates charged by the two legal service providers for time keepers at the same level. The result is an adjusted weighted hourly rate figure whose deltas are attributable to differences in seniority or staffing, as opposed to difference in rate.

In the third step the percentage delta between these adjusted weighted hourly rate figures for the legal service providers being evaluated is refined to further account for specific differences in staffing, not just across the overall matter, but particularly with respect to the unit or task in question. This is achieved by calculating, for each legal service provider, the weighted percentage delta between the blended hourly rate for the particular unit and the weighted average hourly rate for the entire legal service provider team working on the overall matter. Finally, in the fourth step, the task-specific staffing delta from the third step is combined with the matter staffing delta from the second step to calculate the portion of unit cost variance attributable to seniority variance between the legal service providers being evaluated with respect to that particular unit or item.

The efficiency variance is calculated by dividing unit cost by the corresponding blended hourly rate to arrive at a figure referred to as assumed number of hours per unit, and then comparing these two side by side among the service providers. The percentage delta between the legal service providers with respect to assumed number of hours per unit forms the basis of unit cost variance attributable to the differences in efficiency or the number of hours to be expended per unit.

Another aspect of the present invention is the ability to perform comparative analysis of legal services provider performance using analysis constraints. This is different from the price quote process described above in that this analysis relates to comparisons between legal services providers on active matters handled for a particular company. In accordance with this aspect the user can not only define the analysis constraints, but can also define the weighting of various criteria used for calculating a total score. An exemplary representation of the result of analyzing the data using the analysis constraints, and then adjusting the data based on the scoring and weighting is illustrated in FIG. 14. This provides not only a convenient visual for comparing legal service providers, but also for visualizing how a particular legal service provider scored relative to a total possible score. Although not illustrated, the output in FIG. 14 can also include a numerical value representing the score achieved by each legal service provider.

In addition to the various data described above, this aspect of the invention can include evaluation scores from the particular user and/or other users who have worked with the legal service provider in the past, experience profiles and scoring based on the number and types of similar matters handled by the legal service provider in the past, outcome profiles and scoring based on the results achieved by the legal service provider on similar matters in the past, and quantified provider performance metrics, including accuracy of budgets submitted, reliability of financial forecasts, timeliness in submitting budgeting and forecasting data, accuracy of billing data, composite unit cost profiles, etc.

Yet another aspect of the present invention is the provision of a centralized electronic marketplace allowing users to evaluate and compare offerings of legal services providers across various domains, including quality and price, based on measurable factors (qualitative, quantitative and others) as well as performance track record. This is different from the price quote process and the comparative analysis legal ices providers described above in that this analysis relates to comparisons between legal services providers on matters handled across a number of companies in a particular industry or across a number of companies in a number of industries. As with the comparative analysis of legal services providers described above, this analysis provides for user customization of the weighting for various measurement criteria. The assessment criteria can include experience and track record for matter handled and results obtained, evaluation scores from a community of users in the same industry or across a number of industries, historical performance data tracked by the system of the present invention, etc.

Another aspect of the present invention is the ability to evaluate and put into historical and comparative context a legal service provider's rate increases over a given period. This is particularly helpful in situations where clients or companies on the one hand have to deal with some legal service providers that have "frozen" rates for multiple years then seek a substantial rate increase, and on the other hand deal with legal service providers that seek more modest rate increases more frequently. These disparate patterns make it challenging to comparatively evaluate increases on an annualized "apples-to-apples" basis. To remedy this, the system of the present invention queries historical data (205) to extract several years of billing rate information for a particular timekeeper, or group of timekeepers. Then, by applying an algorithmic computation, the system produces a Compound Annual Growth Rate (CAGR) figure to reflect the annualized rate of increase for the timekeeper, group of timekeepers, or legal service provider in question. These CAGR rate increase figures can be compared with those for other timekeepers or legal service providers in the corresponding periods to assess whether a particular rate of increase is consistent with the median range of industry patterns, or is higher or lower. The CAGR figures and comparisons can be depicted graphically or numerically. The focus of the analysis within the system may be historical CAGR rate increase patterns vs. historical CAGR rate increase patterns; historical CAGR rate increase patterns vs. a new rate increase request; or a new rate increase request vs. a blinded, aggregate comparison of similar new rate increase requests from across the industry or other industries.

The CAGR algorithm is calculated as follows:

$$CAGR = [(\text{Final Value}/\text{Starting Value})^{(1/number\ of\ years)}] - 1$$

Depicted differently:

$$CAGR(t_0, t_n) = \left(\frac{V(t_n)}{V(t_0)}\right)^{\frac{1}{t_n-t_0}} - 1$$

Where: $V(t_0)$=start value; $V(t_n)$=finish value; $t_n-t_0$=number of years.

Yet another aspect of the present invention is the system's ability to apply a particular rate of inflation to historical unit cost figures in order to soundly compare them to current unit cost prices. This inflationary multiplier functionality enables a user to validly assess historical unit cost prices in current dollars, overcoming analytical hurdles presented by stale price figures listed in past years' dollar amounts.

The various options for user-selected inflationary multiplier include:

a) Marco-economic figures such as consumer price index or producer price index, b) Industry-specific metrics such as industry-wide inflationary or rate increases year over year, c) Targeted industry metrics such as inflationary or rate increases for the top 100 legal service providers in the US or globally, and d) Legal service provider-specific metrics such as inflationary or rate increases year-over-year for that particular legal service provider.

Although exemplary embodiments of the present invention have been described in connection with particular inputs, outputs and calculations, the present invention is not limited to these specific examples. Thus, the present invention can also provide one or more users with a list of their legal matters or legal matters handled by their company, and allow the users to view or modify data associated with the legal matters. For example, a user can view a spreadsheet view of the tasks and associated hours, rate, units and costs. As a matter progresses, the number of hours, rate and/or units can be updated to reflect changes in the matter. Moreover, the present invention can output bar graphs or pie charts comparing the costs per legal service provider or per matter, the hours per legal service provider or per matter, blended rates per legal service provider or per matter, the monthly budget versus actual budget on a per month basis, per quarter or per year basis, projected milestones versus actual milestones on a per unit basis, etc. The present invention can also provide a calendaring feature populated by the data input using the mechanisms of FIGS. 10A-10E and 11A-11D, so that task milestones can be tracked.

It should be recognized that although exemplary embodiments of the present invention have been described in connection with the provision of legal services by legal service providers, the present invention is equally applicable to the provision of other types of services by other types of service providers.

It should also be recognized that the present invention, by collecting and analyzing data accord to unit cost and/or ratio cost measures, can benefit consumers of legal services by increasing competition among legal service providers, which can result in an overall reduction in costs.

It should be recognized that the various analysis and graph generation described herein can be performed using software loaded from a non-transient computer-readable medium into one or more processors, which execute the software to perform the analysis and generate the graphs.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method, comprising:
   receiving, by a processor, a plurality of sets of pricing information for a particular matter, each of the plurality of sets of pricing information including a number of units for each of a plurality of different tasks and a total price, wherein each of the plurality of different tasks is identified by a different task identifier;
   identifying, by the processor, a first common task among the plurality of sets of pricing information using the different task identifiers;
   calculating, by the processor, a set of costs for the sets of pricing information, wherein the set of costs includes, for each of the plurality of sets of pricing information, a cost for the first common task, wherein the cost is a unit cost or ratio cost, and wherein for each of the plurality of sets of pricing information
      the unit cost is calculated by dividing a total cost for the first common task for a particular set of pricing information by the number of units for the particular set of pricing information, and
      the ratio cost is calculated by dividing the total cost for the first common task for the particular set of pricing information by the total price for the particular set of pricing information;
   receiving, by the processor, analysis constraints;
   selecting from the set of costs for the particular matter, by the processor based on the analysis constraints, the calculated costs for a subset of the plurality of sets of pricing information;
   generating, by the processor, a cost model based on the selected costs for the first common task;
   outputting, by the processor to an output device, the cost model;
   comparing, by the processor, an additional set of pricing information with the cost model; and
   outputting, by the processor to the output device, results of the comparison of the additional set of pricing information with the cost model.

2. The method of claim 1, wherein the sets of pricing information are price quotes for new work or a budget proposal for existing work.

3. The method of claim 1, wherein the sets of pricing information include historical pricing information and at least one of a price quote for new work or a budget proposal for existing work.

4. The method of claim 3, wherein the additional set of pricing information is the at least one of the price quote for new work or the budget proposal for existing work.

5. The method of claim 1, wherein the task identifier is a task code.

6. The method of claim 1, wherein the analysis constraints are usage patterns, a source of the pricing information, or a type of work associated with the billing data.

7. The method of claim 6, wherein the usage patterns are individual usage patterns, organizational usage patterns, blinded market usage patterns for a particular industry or blinded market usage patterns across a plurality of industries.

8. The method of claim 6, wherein the source of the pricing information is a user's active matters, a user's historical matters or a blinded market sampling of similar active or historical matters of other users.

9. The method of claim 6, wherein the type of work associated with the billing data includes a nature of the project based on subject matter, the scope of the project based on volume of work to be performed, scope of the project based on complexity of the work to be performed or an extent of specialized expertise or experience required.

10. The method of claim 1, comprising:
determining, by the processor, a unit cost variance between the received sets of pricing information by calculating a sum of a billing rate variance, a seniority variance and an efficiency variance.

11. The method of claim 10, wherein the billing rate variance is calculate by comparing rate totals for identical sample subset teams across the received sets of pricing information, the seniority variance is calculated by comparing an impact attributable to different staffing patterns with respect to a same task across the received sets of pricing information, and the efficiency variance is calculated by dividing a unit cost by a corresponding blended hourly rate to generate an assumed number of hours per unit and then comparing the assumed number of hours per unit among the received sets of pricing information.

12. A non-transitory computer-readable medium storing instructions, which when executed by a processor, cause the processor to:
receive a plurality of sets of pricing information for a particular matter, each of the plurality of sets of pricing information including a number of units for each of a plurality of different tasks and a total price, wherein each of the plurality of different tasks is identified by a different task identifier;
identify a first common task among the plurality of sets of pricing information using the different task identifiers;
calculate a set of costs for the sets of pricing information, wherein the set of costs includes, for each of the plurality of sets of pricing information, a cost for the first common task, wherein the cost is a unit cost or ratio cost, and wherein for each of the plurality of sets of pricing information
the unit cost is calculated by dividing a total cost for the first common task for a particular set of pricing information by the number of units for the particular set of pricing information, and
the ratio cost is calculated by dividing the total cost for the first common tasks for the particular set of pricing information by the total price for the particular set of pricing information;
receive analysis constraints;
select from the set of costs for the particular matter, based on the analysis constraints, the calculated costs for a subset of the plurality of sets of pricing information;
generate a cost model based on the selected costs for the first common task;
output, to an output device, the cost model;
compare an additional set of pricing information with the cost model; and
output, to the output device, results of the comparison of the additional set of pricing information with the cost model.

13. The non-transitory computer-readable medium storing instructions of claim 12, wherein the pricing information are price quotes for new work or a budget proposal for existing work.

14. The non-transitory computer-readable medium storing instructions of claim 12, wherein the sets of pricing information include historical pricing information and at least one of a price quote for new work or a budget proposal for existing work.

15. The non-transitory computer-readable medium storing instructions of claim 14, wherein the additional set of pricing information is the at least one of the price quote for new work or the budget proposal for existing work.

16. The non-transitory computer-readable medium storing instructions of claim 12, wherein the task identifier is a task code.

17. The non-transitory computer-readable medium storing instructions of claim 12, wherein the analysis constraints are usage patterns, a source of the pricing information, or a type of work associated with the billing data.

18. The non-transitory computer-readable medium storing instructions of claim 17, wherein the usage patterns are individual usage patterns, organizational usage patterns, blinded market usage patterns for a particular industry or blinded market usage patterns across a plurality of industries.

19. The non-transitory computer-readable medium storing instructions of claim 17, wherein the source of the pricing information is a user's active matters, a user's historical matters or a blinded market sampling of similar active or historical matters of other users.

20. The non-transitory computer-readable medium storing instructions of claim 17, wherein the type of work associated with the billing data includes a nature of the project based on subject matter, the scope of the project based on volume of work to be performed, scope of the project based on complexity of the work to be performed or an extent of specialized expertise or experience required.

21. The non-transitory computer-readable medium storing instructions of claim 17, comprising:
determining, by the processor, a unit cost variance between the received sets of pricing information by calculating a sum of a billing rate variance, a seniority variance and an efficiency variance.

22. The non-transitory computer-readable medium storing instructions of claim 21, wherein the billing rate variance is calculate by comparing rate totals for identical sample subset teams across the received sets of pricing information, the seniority variance is calculated by comparing an impact attributable to different staffing patterns with respect to a same task across the received sets of pricing information, and the efficiency variance is calculated by dividing a unit cost by a corresponding blended hourly rate to generate an assumed number of hours per unit and then comparing the assumed number of hours per unit among the received sets of pricing information.

* * * * *